(12) United States Patent
Li et al.

(10) Patent No.: US 10,542,515 B2
(45) Date of Patent: Jan. 21, 2020

(54) LOCATION TRACKING IN WIRELESS NETWORKS

(71) Applicants: Xu Li, Nepean (CA); Hang Zhang, Nepean (CA)

(72) Inventors: Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/656,446

(22) Filed: Jul. 21, 2017

(65) Prior Publication Data

US 2018/0041984 A1 Feb. 8, 2018

Related U.S. Application Data

(60) Provisional application No. 62/442,791, filed on Jan. 5, 2017, provisional application No. 62/370,588, filed on Aug. 3, 2016.

(51) Int. Cl.

| | |
|---|---|
| *H04W 8/08* | (2009.01) |
| *H04W 64/00* | (2009.01) |
| *H04W 68/02* | (2009.01) |
| *H04W 72/04* | (2009.01) |
| *H04W 88/02* | (2009.01) |

(52) U.S. Cl.
CPC ............ *H04W 64/00* (2013.01); *H04W 8/08* (2013.01); *H04W 68/02* (2013.01); *H04W 72/042* (2013.01); *H04W 88/02* (2013.01)

(58) Field of Classification Search
CPC .......................... H04W 64/00; H04W 68/00
See application file for complete search history.

(56) References Cited

U.S. PATENT DOCUMENTS 9,094,933 B2   7/2015  Horn et al.
9,801,014 B2 * 10/2017 Acharya .............. H04W 68/005
(Continued)

FOREIGN PATENT DOCUMENTS

CN       101068370 A     11/2007
CN       104619023 A      5/2015
(Continued)

OTHER PUBLICATIONS

International Search Report dated Oct. 11, 2017 for corresponding International Application No. PCT/CN2017/094124 filed Jul. 24, 2017.
(Continued)

*Primary Examiner* — Charles N Appiah
*Assistant Examiner* — Frank E Donado

(57) ABSTRACT

A method for tracking a location of a User Equipment (UE) connected to a network is provided. When the UE is in an IDLE state, and a mobility management entity of the network receives a notification message that downlink data is available for the UE, the mobility management entity may transmit paging instructions to access points in a paging area. The paging area may be defined as one or more access points within one or more tracking areas. The tracking areas may be defined as a one or more access points from which the UE can access the network. The paging areas may further be defined by a mobility pattern of the UE that tracks location and mobility behaviour of the UE.

20 Claims, 15 Drawing Sheets

(56) References Cited

U.S. PATENT DOCUMENTS

| | | | |
|---|---|---|---|
| 2009/0182871 A1* | 7/2009 | Gupta | H04W 68/06 709/224 |
| 2011/0053591 A1* | 3/2011 | Kubo | H04W 68/04 455/435.1 |
| 2012/0188938 A1* | 7/2012 | Venkatraman | H04W 64/003 370/328 |
| 2014/0024378 A1* | 1/2014 | Khude | H04W 8/06 455/437 |
| 2014/0247811 A1* | 9/2014 | Singh | H04W 36/0033 370/332 |
| 2014/0364155 A1* | 12/2014 | Iwai | H04W 68/04 455/458 |
| 2015/0038180 A1* | 2/2015 | Quick, Jr. | H04W 64/00 455/458 |
| 2015/0215830 A1* | 7/2015 | Dalsgaard | H04W 36/0094 455/444 |
| 2016/0183215 A1* | 6/2016 | Horn | H04W 60/00 455/435.2 |
| 2017/0048766 A1* | 2/2017 | Wang | H04W 4/08 |
| 2017/0257766 A1* | 9/2017 | Fox | H04W 60/00 |
| 2017/0289957 A1* | 10/2017 | Zhang | H04W 68/02 |
| 2017/0359693 A1* | 12/2017 | Rao | H04W 4/029 |

FOREIGN PATENT DOCUMENTS

| | | |
|---|---|---|
| WO | 2014048478 A1 | 4/2014 |
| WO | 2016041771 A1 | 3/2016 |
| WO | 2016078377 A1 | 5/2016 |

OTHER PUBLICATIONS

3GPP TR 23.799: "Study on Architecture for Next Generation System," Jun. 2016.

3GPP TS 24.301: "Non-Access-Stratum (NAS) protocol for Evolved Packet System (EPS)," Jun. 2016.

* cited by examiner

LOCATION TRACKING IN WIRELESS NETWORKS

CROSS-REFERENCE TO RELATED APPLICATIONS

This application claims the benefit of priority to U.S. Provisional Patent Application No. 62/370,588 filed Aug. 3, 2016, and U.S. Provisional Patent Application No. 62/442,791 filed Jan. 5, 2017, the contents of each of which are incorporated herein by reference in their entirety.

FIELD OF THE INVENTION

The present invention pertains to the wireless networks and in particular to tracking devices connected to a wireless network.

BACKGROUND

In third and fourth generation (3G/4G) wireless networks, a core network function is responsible for tracking the location of user equipment (UE), such as smartphones and other wireless connected devices. This allows the network to manage its connections. A network function may track the location of a UE, even when the UE is idle. This allows the network to be able to push data to the UE when there is downlink traffic, such as data, messages, a voice call, or the like. It will be understood that the granularity with which the network function tracks a UE may be different depending on whether the UE is idle or connected.

In general, a node or function within the network (e.g. a Mobility Management Entity in an LTE network, or an AMF in a 5G network) defines tracking areas (TAs), which may be geographical or logical boundaries within the network with which an IDLE UE is associated. A TA is a region based on the topology of the network, and is typically defined by a listing of the access points (APs), also referred to as access nodes (ANs), through which a UE can reached while in the TA. In 3G/4G networks, a UE is "located" by identifying the TA within which the UE is accessing the network. It is understood that the UEs registered to the network but in IDLE mode are assigned with a Tracking Area List (TAL). The TAL is a list of one or more TAs, where each TA defines one or more ANs (or APs). An idle UE is located by identifying the TAL within which the UE is accessing the network. A current TA (or TAL) is identified when the UE moves out of a previous TA (or TAL) and, leaving the list of APs (or ANs), requests a location update (from an AN within the new TAL). In response to the request the network supplies the UE with the current TA (i.e. a list of new APs to be used by the UE to maintain contact). Accordingly, location tracking is currently coupled to the TA update operations. When a UE has been located within a TA, the network may contact the UE to communicate downlink traffic by "paging" the UE within the current TA.

A limitation of this approach is that TAL-wide paging is a fairly inefficient use of resources as it generates wireless traffic in locations where the UE is not present, in order to contact the UE. Accordingly, there is a need for a system and method for location tracking that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of embodiments of the present invention is to provide systems and methods for tracking devices connected to a wireless communications network.

In accordance with embodiments of the present invention, there is provided a method comprising receiving a notification message associated with downlink data, and transmitting a paging request only to a paging area (PA). The PA includes at least a first access point (AP) of a tracking area (TA) and the PA omits at least a second AP of the TA.

In accordance with embodiments of the present invention, there is also provided a network function comprising a network interface for receiving data from and transmitting data to network functions connected to a network, a processor, and a non-transient memory for storing instructions that when executed by the processor cause the network function to be configured to receive a notification message associated with downlink data, and transmit a paging request only to a PA. The PA includes at least a first access AP of a TA and the PA omits at least a second AP of the TA.

In accordance with embodiments of the present invention, there is also provided a method comprising receiving a notification message associated with downlink data, and transmitting a paging request only to a PA. The PA includes at least a first AP of a first TA and at least a second AP of a second TA.

In accordance with embodiments of the present invention, there is also provided a network function comprising a network interface for receiving data from and transmitting data to network functions connected to a network, a processor, and a non-transient memory for storing instructions that when executed by the processor cause the network function to be configured to receive a notification message associated with downlink data, and transmit a paging request to a paging area (PA). The PA includes at least a first AP of a first TA and at least a second AP of a second TA.

In the context of ever expanding device population, it may be desirable to control the paging overhead. At least some of these embodiments bear on this problem by providing a variety of flexible and/or segmented paging options.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1:
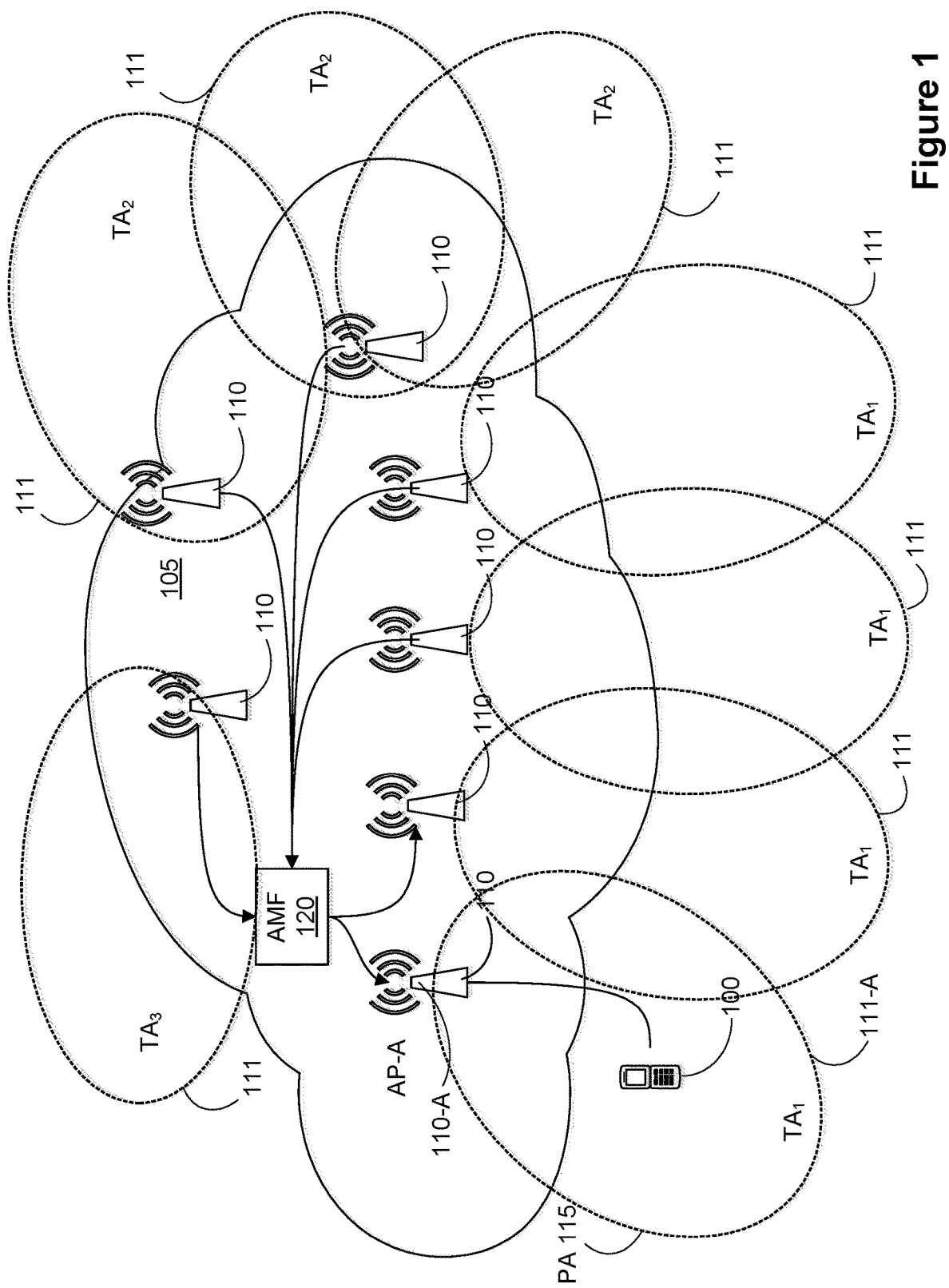
FIG. 1 illustrates an embodiment of a network diagram illustrating a location tracking system.

Referring to FIG. 1, an embodiment of a network diagram illustrating a location tracking system is presented. In the embodiment of FIG. 1, a plurality of Access Points (AP) 110, also referred to as Access Nodes (ANs) 110 (the terms "AP 110" and "AN 110" are used interchangeably herein), are illustrated providing connectivity to an access network (AN) 105, such as Radio Access Network (RAN) 105 (the terms "AN 105" and "RAN 105" are used interchangeably herein). Each AP 110 (or AN 110) has at least one coverage area 111 i.e. a geographic area in which a UE may be paged. Groups of coverage areas 111 may be logically combined to form a tracking area $TA_1$, $TA_2$, $TA_3$. In operation, a TA may be defined as a list of APs 110 (or ANs 110), and accordingly a corresponding set of coverage areas 111 that are supported by the listed APs 110 (or ANs 110). That is, the TA is defined by a list of APs 110 (or ANs 110) (e.g. a Tracking Area List (TAL)) that are available to service the UE 100 in the current TA.

In FIG. 1, a UE 100 is illustrated accessing the AN 105 (also referred to as the RAN 105) in the coverage area 111-A supported by AP-A 110-A (also referred to as the AN-A 110-A). In the embodiment of FIG. 1, this coverage area 111-A is further defined as a Paging Area (PA) 115. A PA 115 may be composed of one or more coverage areas 111, typically, though not necessarily, within a single TA. In the example of FIG. 1, the PA 115 comprises a single coverage area 111-A. In some embodiments, a PA 115 may comprise a portion of a TA that is different than the TA, such as a subset of the TA, by omitting at least one AP 110 (or AN 110) from the TA. The PA 115 may also include APs 110 (or ANs 110) that are external to the TA. In some embodiments, PAs 115 may be geographically or topologically contiguous, while other PAs 115 may not be geographically or topologically contiguous. It is understood that for two coverage areas to be topologically contiguous, the two coverage areas may share a common AP 110, or at least one AP 110 in one of the two coverage areas is linked with another AP 110 in the other coverage area.

A core access and mobility management function (AMF) may include a mobility management (MM) function or entity 120 within the AN 105 (or RAN 105) that manages the TAs and defines any PA within the TAs. The MM 120 may further configure and manage a location tracking mechanism for the UE 100 accessing the AN 105 (or RAN 105). It will be understood that the MM 120 may define the TA associated with a UE 100 entering IDLE mode in accordance with the UE location and a mobility pattern associated with the UE 100. The MM 120 may, in some embodiments, determine that based on a mobility pattern that indicates that the UE is moving quickly to only include ANs that have large coverage areas in the TA to avoid having small cells with limited coverage areas transmit paging messages to the UE 100. Conversely, the MM 120 may, in accordance with a mobility pattern indicative of a low mobility UE, define a tracking area to have a relatively small coverage area defined by a number of small cells.

In operation the MM 120 maintains a mobility model, also referred to as a mobility pattern or a mobility profile (the terms "mobility model", "mobility profile" and "mobility pattern" are used interchangeably herein), for each UE 100 accessing the AN 105 (or RAN 105), and is associated with the NIM 120. The mobility model allows for fine-grained location tracking of the UE 100 in addition to conventional tracking. In an embodiment, the mobility model utilizes a location update procedure, such as a UE-assisted Mobility Pattern Update (UE-MPU) procedure, in which a location of a UE 100 is updated based upon one or more tracking criteria in addition to a boundary crossing event, such as crossing a TA (or TAL) boundary. The one or more tracking criteria may include, for instance a location update timer, a change in device motion behaviour, boundary crossings, change in which node is accessed and/or a detected inconsistency (error or inaccuracy) between a predicted UE location and a measured UE location. Based on the one or more tracking criteria applied to a UE 100, the mobility model determines whether to initiate a location update for that UE 100.

Because the location update procedure (e.g., the UE-MPU procedure) can be decoupled from the TA procedure (e.g. TA Update (TAU) procedure), the mobility model may allow the network to locate the UE 100 within a subsection of the TA. In an implementation the location update procedure may be encompassed within the TAU procedure. If there is downlink traffic to be communicated to the UE 100, the AN 105 (or RAN 105) may use the information obtained by using a tracking mechanism defined by the mobility model corresponding to the UE 100 to locate the UE 100 and to assign, using the MM 120 function, a paging area (PA) 115 within which to page the UE 100. The PA 115 may be a smaller area than the TA (or TAL) within which the UE 100 is located. That is, the MM 120 (e.g. an AMF comprising the MM 120) can use mobility pattern or information to define a PA 115 that is smaller than the TA. When the PA 115 is smaller than the TA (or TAL), it can allow for a reduction in the paging overhead within the TA (or TAL). In some embodiments, the PA 115 may extend across a TA (or TAL) boundary, when the mobility model associated with the UE 100 indicates that there is a likelihood that the UE 100 is between, or close to, a TA (or TAL) boundary. The decoupling of the location tracking from the TA procedure (e.g. TAU procedure) allows for a PA 115 to be tailored to a current likely location of the UE 100, as well as to account for movement behaviour which may be indicative that the UE 100 has, or is about to, leave a current coverage area 111 or TA.

In some embodiments, a TA may include different types of APs 110 (or ANs 110) such as macro cells, small cells and other cell types. Small cells may include picocells, femtocells, metro cells and other cell types. Some small cells may cover a geographically smaller area (such as a building or campus, or a floor of a building) than the geographic area covered by macro cells (such as a few city blocks or several square kilometers). TAs may also include at least one of: cells that provide a high frequency connection, cells of different wireless technologies (such as WiFi) or access technologies, and cells operating at different frequencies. A PA 115 may comprise any combination of any number of APs 110 of different cell types. In some embodiments, wireline-based access is a type of access technology.

Figure 2:
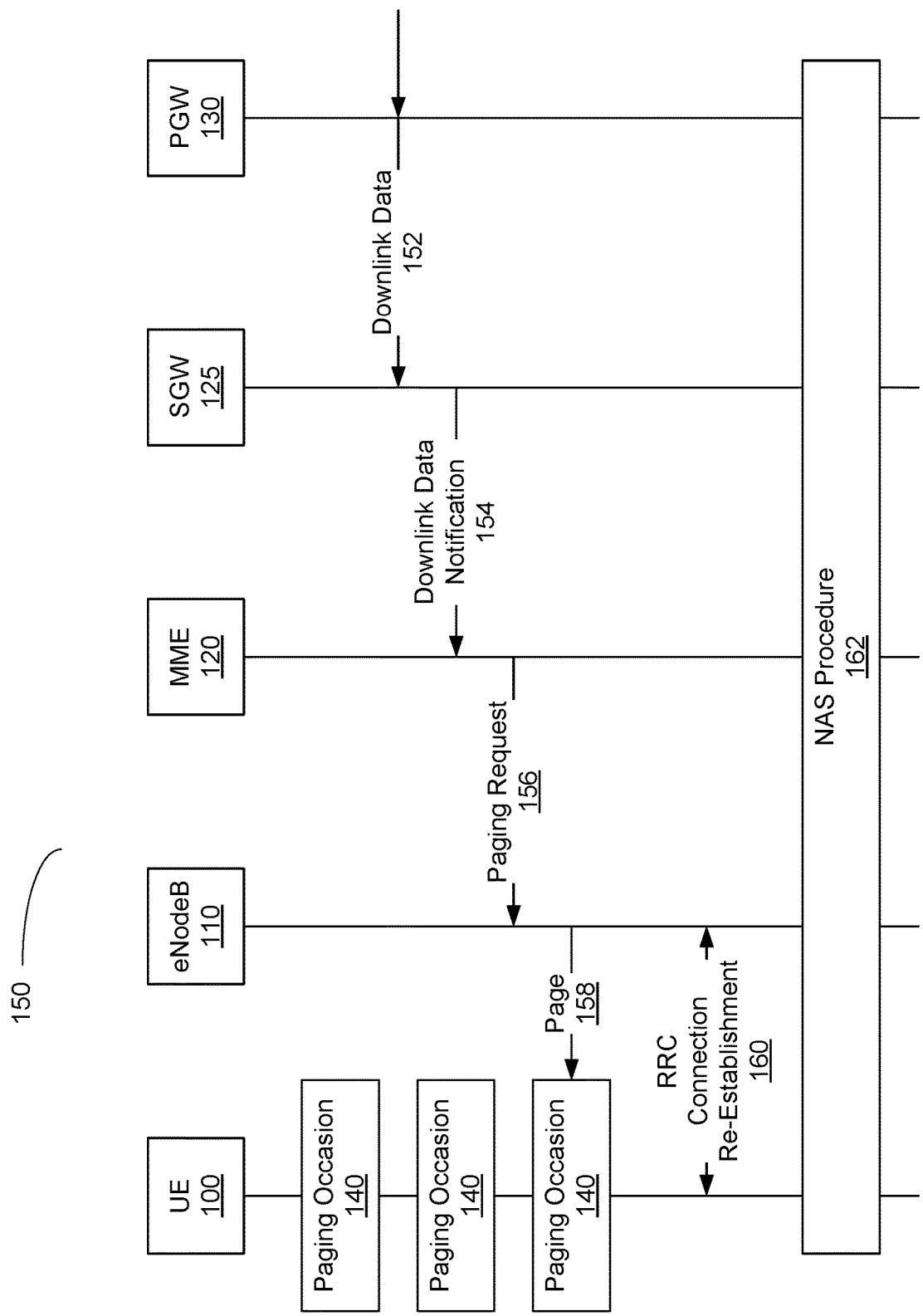
FIG. 2 is a message call flow diagram illustrating an example of a method for paging a user equipment (UE).

FIG. 2 is a call flow diagram illustrating an example of a method for paging 150 a UE. A UE 100 may be in an IDLE state. While in the IDLE state, the UE 100 periodically (e.g. once every discontinuous reception (DRX) cycle) comes out of a sleep mode, activates its radio network interface and listens for a page addressed to it at the defined paging occasion 140. A paging occasion 140 (also referred to as a paging opportunity) is a periodic network broadcast to all UEs 100 located within a TA. If a page is transmitted at the paging occasion 140, and is intended for, and received by, the UE 100, then the UE 100 requests a radio resource connection (RRC) establishment 160 with the network, and initiates a non-access stratum (NAS) procedure to transition to the CONNECTED state.

In a Long-Term Evolution (LTE) network, downlink data 152 intended for a UE 100 may be received by a Packet GateWay (PGW) 130 in the Core Network (CN). The PGW 130 may transmit or forward the downlink data 152 to a Serving GateWay (SGW) 125 in the CN. If the SGW 125 does not have a destination to send the downlink data (e.g. to which AN to send the downlink data), then the SGW 125 may transmit a downlink data notification 154 message to a mobility management 120 entity. The mobility management 120 entity (also referred to as a MME 120) tracks the location of the UE 100 by storing the last known TA from which the UE 100 was connected to the network via an AP 110 (e.g. an eNodeB 110). The MME 120 may send a paging request 156 message to all eNodeBs 110 in the TA (or TAL). Each eNodeB 110 in the TA (or TAL) will broadcast a page 158 message receivable by UEs 100 in the TA. The broadcast page 158 message results in the addition of the UE 100 (or its identifier) in a paging occasion 152. While in the IDLE state, a UE 100 listens for a page 158 message. Upon receipt of a page 158 message, the UE 100 processes the received page 158 message to determine if it identifies the UE 100. If the page 158 message includes a reference to the UE 100, then the UE 100 may initiate an RRC Connection Re-establishment 160 procedure (mentioned above) with the eNodeB 110. The UE 100 may then initiate a NAS Procedure 162 (mentioned above) to enter a connected state in order to send and receive messages, including the downlink data.

Figure 3A:
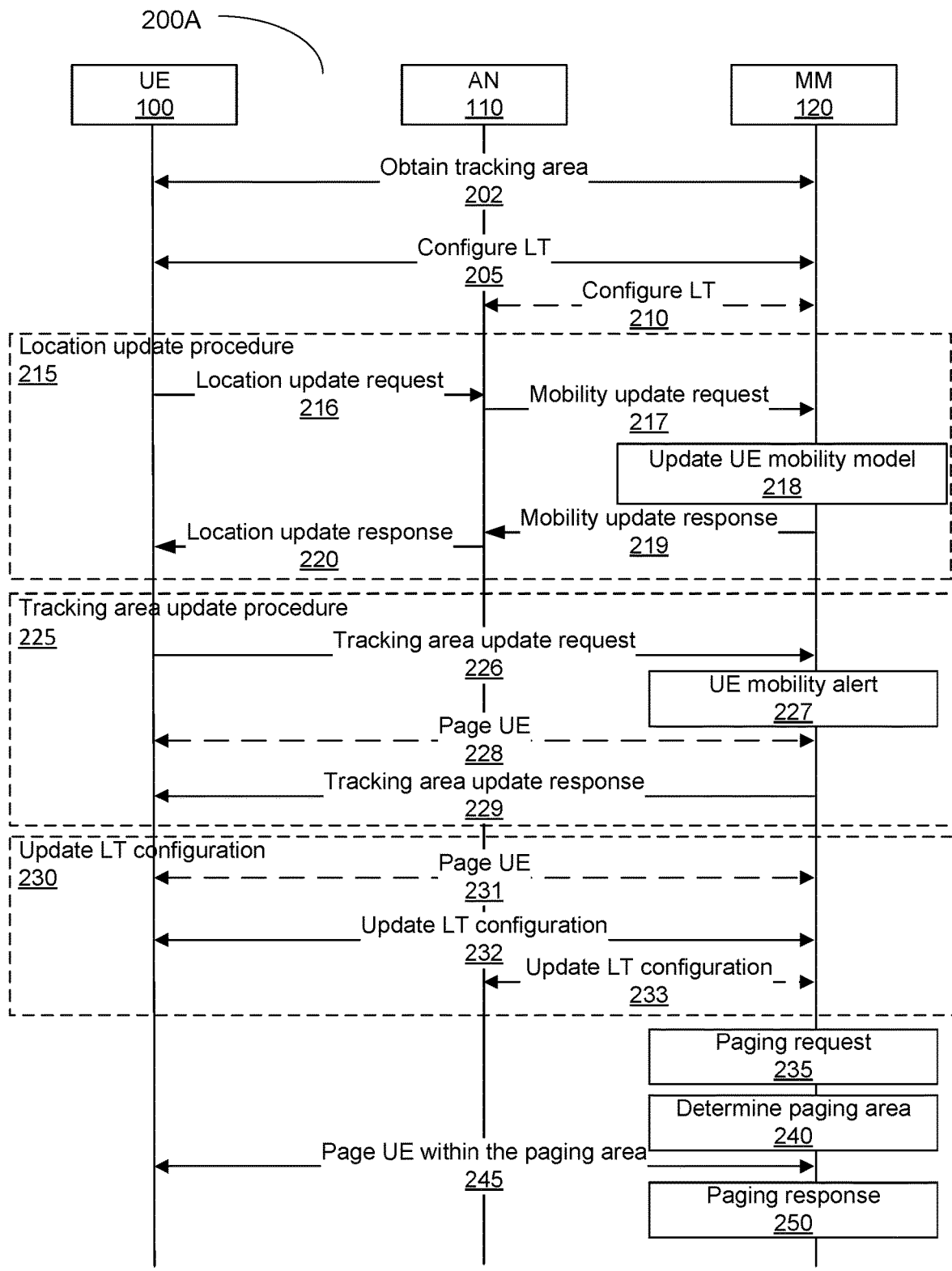
FIG. 3A is a signalling diagram illustrating an embodiment of a tracking procedure.

Referring to FIG. 3A, a signalling diagram illustrating an embodiment of a tracking procedure 200A is presented. In this procedure 200A, location tracking is implemented in the MM entity 120. In some embodiments, a location service may be used to facilitate location tracking (LT). For example, a UE 100 may request positioning information from a location service (LCS) offered by the network. The network may measure the signal of the UE 100, determine the UE location, and send the information to the UE 100 in response to the request for positioning information. Other information may be provided by the UE 100 to the location service (such as Global Positioning System (GPS) coordinates) for the location service to obtain a more accurate positioning information result for the UE 100. This positioning information may be used for location tracking of the UE 100. In some embodiments, the MM function 120 obtains the UE positioning information from the location service. In some embodiments, the location service may include location tracking (and mobility modeling) functionality and the MM function 120 may query the location service for UE mobility profile information or UE location information. Steps 215, 225, 230, shown with stippled outlines, are not necessarily successive steps in the tracking procedure, but operational steps that may occur as necessary depending upon whether step-specific criteria are met. Generally, a location tracking area is configured in order to locate a UE 100 for paging. Steps 215, 225, 230 indicate steps that may occur, singly or repeatedly, between paging requests based upon the step-specific criteria to assist in maintaining the location tracking area configuration for that UE 100.

In step 202, the UE 100 obtains a TA from the MM entity 120. In some embodiments, the UE 100 may obtain a plurality of TAs (i.e. TAL), including its current TA. The TA is defined by a list of radio cells or APs 110 (or ANs 110). A TA may also be associated with a geographic boundary (such as a geographic grid). The current TA may define the list of APs 110 (or ANs 110) that the UE 100 should currently either be in contact with, or be expected (in accordance with factors such as a predicted mobility) to move between. Referring to FIG. 1, the UE 100 is currently within $TA_1$.

In step 205, the MM 120 sets up a location tracking procedure, such as a UE-MPU procedure, for the UE in accordance with a selected mobility model, or MP generation algorithm. In the case of a mobility pattern (MP) generation algorithm, the MP of the UE 100 is generated using location reports corresponding to locations of the UE 100 measured over a period of time. The configuration step 205 may include selecting a location tracking method, or MP generation algorithm, to be used for that UE 100 at that time, and any associated parameters. The MM 120 sends an instruction to UE 100 to configure its location tracking, or UE-MPU, so as to report location tracking information back to the MM 120. The information transmitted back to MM 120 can be used in order to configure and subsequently update the mobility model or MP generation algorithm, as the case may be. Updating the MP generation algorithm may lead to also reconfiguring the UE-MPU. In an aspect, the configuration step 205 may include location update configuration parameters used to determine when the UE 100 should initiate a location update procedure. The parameters may include, for instance, a location update timer, or mobility criteria to be evaluated by the UE 100 to determine whether to initiate the location update procedure. The tracking method and associated parameters may differ between UE 100, and may change depending upon location within a TA, or UE movement behaviour. For instance, if a UE is associated with a user that is walking, the tracked UE movement behaviour will be a relatively slow movement within a coverage area 111. If the user steps onto a bus, the UE movement behaviour will change to a relatively fast movement along a bus route, which may lead to crossing between coverage areas 111 more quickly than a user walking. Changes to a mobility profile may trigger the location update procedure, for instance by the UE 100 sending a location update request. Upon detecting a change in UE movement behaviour, the MM 120 may adjust at least one of the location tracking method and the associated parameters to better model the new movement characteristics through step 230, described in further detail below.

In step 210, optionally, the MM 120 may configure location tracking with the AN 105 (or RAN 105), i.e. with the APs 110 (or ANs 110) within the TA or operations server(s) controlling the APs 110 (or ANs 110). Referring to FIG. 1, the MM 120 may configure all of the APs 110 (or ANs 110) in $TA_1$ to update the MM 120 with any information about the UE 100, the updates being associated with the mobility model for that UE 100.

In step 215, the mobility model may be updated in accordance with a current location of the UE 100. The location update procedure may be triggered by the UE 100, as illustrated in FIG. 3A, or may be triggered by the MM 120. In the embodiment of FIG. 3A, the UE 100 transmits a location update request to the AN 105 (or RAN 105), through an AP 110 (or AN 110), to update a current location of the UE 100. The location update procedure is initiated based upon one or more of the tracking criteria described above, such as expiry of a location update timer, a change in device motion behaviour, boundary crossings, change in which node is accessed and/or a detected inconsistency (error or inaccuracy) between a predicted UE location as maintained by the MM 120 and a measured UE location as determined by the UE 100, the AP 110 (or AN 110), or a mobility function operative on the AN 105 (or RAN 105). Referring to the embodiment of FIG. 3A, in step 215, the location update procedure may consist of 5 operations: steps 216, 217, 218, 219 and 220.

In step 216, the UE 100 sends a location update request 216 to a mobility function operative on the AN 105 (or RAN 105). In an aspect, the mobility function may be resident at the AP 110 (or AN 110) serving the UE 100. The request may include a time instance at which the location is to be measured, and a measured UE location, for example, a geographic location obtained from the Global Positioning System (GPS) as measured by the UE 100. In some aspects, the request from the UE 100 may include little to no information, and the AN 110 may provide the missing information. For example, the AN 110 may insert is own location into the message and add a current time as the measurement time. In some aspects, the AN 110 may append location information as an attachment to the UE request. In some aspects, the AN 110 may edit the UE request, and forward the edited request.

In response to receiving the location update request, the mobility function operative on the AN 105 (or RAN 105) or the AP 110 (or AN 110) generates a mobility update request and transmits the mobility update request to the MM 120 in step 217. The mobility update request may include, for instance, the UE's measured location (e.g., geographic location, cell location, cell ID, etc.), the measurement time, the physical location of the AP 110 (or AN 110) communicating with the UE 100, and/or the AP ID. In step 218, the MM 120 updates the mobility model for that UE 100 based on the mobility update request. In step 219, the MM 120 transmits a mobility update response to the source of the mobility update request to confirm that the mobility model has been updated. In step 220, the AP 110 (or AN 110) serving the UE 100 forwards a location update response to the UE 100, confirming that the location update request has been received and processed.

In an aspect, the UE mobility model may be updated based upon a mobility update request sent by the mobility function operative on the AN 105 (or RAN 105)/AP 110 (or AN 110), or the MM 120, absent a location update request initiated by the UE 100. For instance, in the aspect the AP 110 (or AN 110) or another node within AN 105 (or RAN 105) may be operative to generate and transmit a mobility update request to the MM 120 automatically based upon activity between the AP 110 (or AN 110) and the UE 100. In an implementation, the mobility function may further be operative to page the UE 100 within a defined PA 115 upon expiry of a location update timer. In an implementation, the MM 120 may be operative to maintain the location update timer, and to send a location update trigger to any or all of the APs 110 (or ANs 110) within the PA 115 when a location update is required. In the implementation, the location update timer may comprise an aspect of the mobility model for that UE 100, and may be configured using the associated parameters and environmental factors that may be relevant. For instance, during night time the mobility model may assume a static location for the UE 100 until morning, unless motion is reported by the UE 100, the AP 110 (or AN 110), or the mobility function operative on the AN 105 (or RAN 105). In the embodiments where the location update procedure is initiated by the AP 110 (or AN 110), the AN 105 (or RAN 105), or the MM 120, step 215 may further include the step of paging the UE 100 based upon a paging area defined by the mobility model.

When the UE leaves (or is about to leave) the current TA, or when its motion behaviour changes, in step 225 a tracking area update procedure may be triggered. As noted above, the TA is defined by a list of APs 110 (or ANs 110) (e.g. a Tracking Area List (TAL)) that are available to service the UE 100 in the current TA. As with the location update procedure, the TA update procedure 225 may be initiated by the UE 100, or may be initiated by the entities within AN 105 (or RAN 105) such as the AP 110 (or AN 110) and/or the MM 120 based upon tracking criteria. The tracking area update procedure may include: When the UE 100 identifies the need to update the TA, for instance based upon its location relative to the current TA, the UE 100 sends a tracking area update request 226 to the MM 120. The tracking area update request 226 may include a current physical or logical location of the UE 100.

Alternatively, the MM 120 may identify the need to update the TA based upon the mobility model for that UE 100 and one or more TA (or TAL) criteria, such as the UE's current or predicted location. The current location may be based upon location reports received from the AN 105 (or RAN 105), or may be based upon an estimation generated by the mobility model. The MM 120 may then generate a UE mobility alert 227 triggering a tracking area update for that UE 100.

The MM 120 uses the mobility model and the current location (reported or estimated) of the UE 100 to determine an appropriate tracking area update for the UE 100. If the UE 100 is currently in an idle mode, the MM 120 may page 228 the UE 100 within a PA 115. The MM 120 transmits a tracking area update response 229 to provide the UE 100 with the tracking area update.

In step 230 the MM 120 may determine that it is necessary to modify the location tracking configuration with the UE 100 and/or the AP 110 (or AN 110) of the AN 105 (or RAN 105). Accordingly, the MM 120 can trigger a location tracking configuration update 230 as needed. If necessary, the MM 120 pages 231 the UE 100 within the PA 115; The MM 120 transmits an instruction to configure/update 232 the location tracking performed by the UE 100. The configuration/update may include the location tracking method to be used by the UE 100 and any associated parameters. As above, the location tracking method may be different in the different parts of the TA. The configuration/update may include redefining the current TA of the UE 100. The MM 120 configures/updates 233 the location tracking with the AP 110 (or AN 110) of the AN 105 (or RAN 105) within the current TA.

Steps 235, 240, 245, 250 outline the procedure for paging a UE 100. In step 235, the MM 120 identifies a need to page the UE 100. The need may be identified based upon MM 120 operational criteria or a request received from another network function. In the context of FIG. 3A, this need to page the UE 100 may be independent from the update procedures explained above in steps 215, 225, 230. In step 240 the MM 120 identifies a PA 115 associated with the UE 100 based upon the current TA, the current UE location, and the UE mobility as defined by the mobility model. In most cases the PA 115 comprises a subset of APs 110 (or ANs 110) within the TA. In step 245 the MM 120 pages the UE 100 inside the identified PA (typically by transmitting a paging request to the APs 110 (or ANs 110) within the PA 115). The paging may further include receiving a UE paging response from the UE 100. It should be understood that the UE paging response may take the form of a Service Request. In step 250 the MM 120 may further communicate directly with the UE 100, or may forward a paging response to the network function that informed the MM 120 of the need to page the UE 100.

Figure 3B:
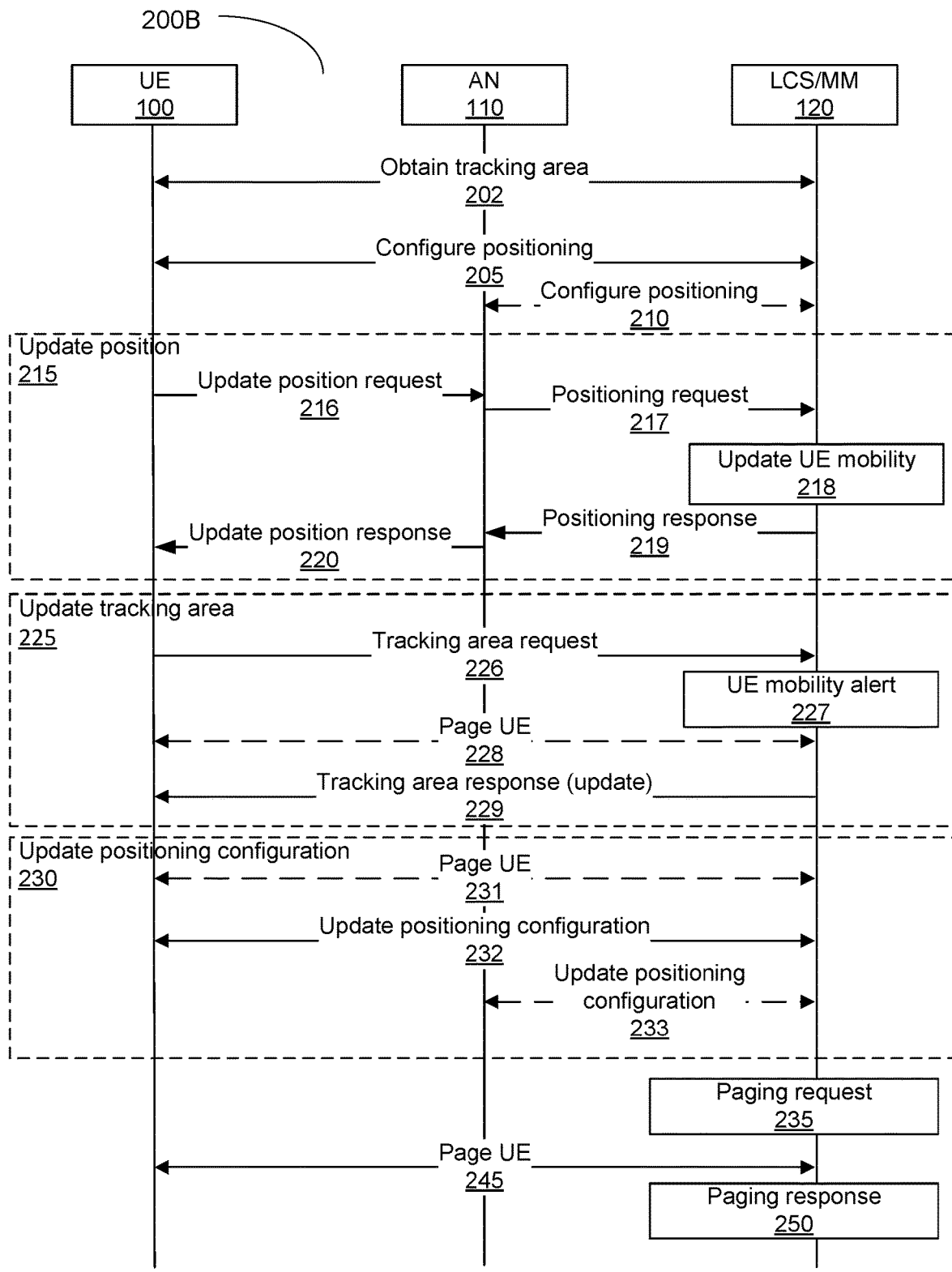
FIG. 3B is a message call flow diagram illustrating a variant of the tracking procedure of FIG. 3A.

FIG. 3B is a message call flow diagram illustrating another example of a location tracking procedure 200B. This procedure 200B is a variant of the location tracking procedure 200A of FIG. 3A. The location tracking procedure 200B shown in FIG. 3B also combines a location service (LCS) with the MM 120 entity. While some method call steps in procedure 200B may have variant names as compared to procedure 200A, the steps themselves are similar and thus the same reference numerals are provided as in FIG. 3A. Step 240 is omitted in the location tracking procedure 200B.

Figure 3C:
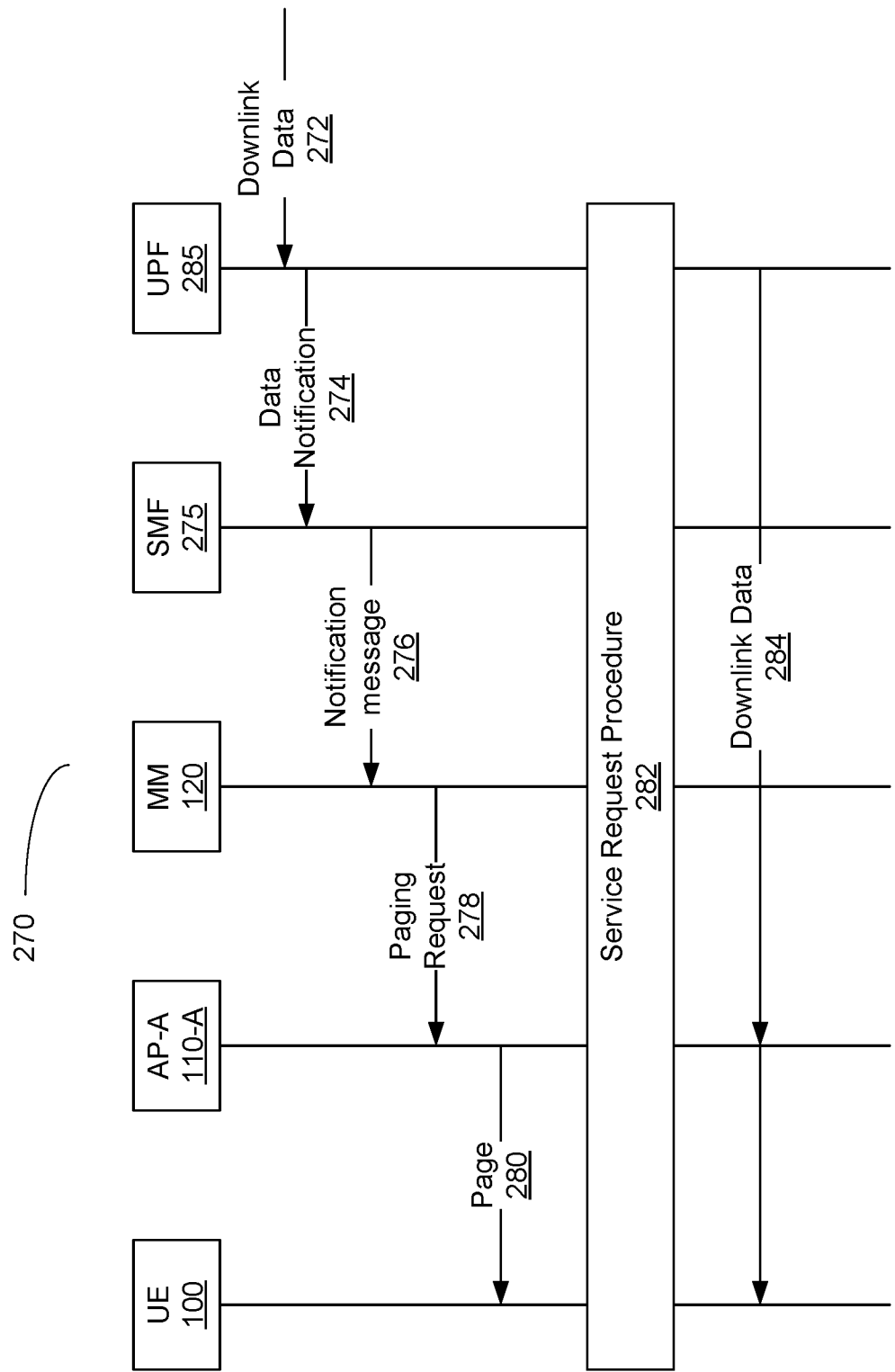
FIG. 3C is a message call flow diagram illustrating an example of a method for paging a UE, in accordance with FIG. 3A.

FIG. 3C is a message call flow diagram illustrating an example of a method for paging 270, in accordance with FIG. 3A, steps 235 to 250. It should be understood that FIG. 3C also applies to steps 235, 245 and 250 of FIG. 3B. The method 270 comprises receiving downlink data 272 at a user plane function (UPF) 285 of the network. Next, the UPF 285 transmits a data notification 274 message to a session management function (SMF) 275. The SMF 275 then transmits a Notification message 276 to the MM 120 entity. It is understood that the MM 120 entity may be an AMF. In some embodiments the SMF 275 may transmit a downlink data notification message to the MM 120 to indicate a UE location request. Based on the notification message 276, and possibly other factors such as the connection status (e.g. UE 100 is in an IDLE state) of the UE 110, the MM 120 entity determines that a paging request is needed (consistent with step 235), and transmits a paging request 278 only to a PA 115 (consistent with step 245). The PA 115 includes at least a first AP 110 of a TA and the PA 115 omits at least a second AP 110 of the TA. Within this definition of a PA, it is envisioned a variety of permutations: Half of the APs, a quarter, some PAs plus PAs from a different TA, one AP, a selection of APs based on a technical similarity such as a mobility type that corresponds to UE mobility, etc. The method may optionally include, as described above with reference to step 245, receiving a paging response (as part of a service request procedure 282) from the first AP 110-A, and sending a response for paging as part of the service request procedure 282 to the network function that sent the Notification message 276, as described above with reference to step 250. Those skilled in the art will appreciate that the response for paging may be a Service Request Message sent from the UE 100 to the MM 120. The MM 120 can then begin authentication and security procedures. Upon the establishment of a secure signalling connection between the UE 100 and the MM 120, signalling messages can be sent to notify the SMF 275 of the location of the UE 100 as being connected to AP-A 110-A. The AMF 275 can then begin to set up the session between the UPF 285 and AP-A 110-A. The exact signalling between the UPF 285 and the SMF 275, the SMF 275 and the MM 120, and between the MM 120 and an access point such as AP-A 110-A may be defined by standards such as 3GPP TS 23.502.

Those skilled in the art will realize, that by employing paging method 270, there is the possibility that UE 100 is non responsive due to, for example, absence from the PA 115. In such a case, step 278 may be repeated (re-transmitting) any number of times, varying the PA to conform to the TA or to conform to some other permutation of PA 115 e.g. a larger PA, a PA increased by one AP, Half of the APs, a quarter, some PAs plus PAs from a different TA.

As noted, the Notification message 276 may be as described above with regards to step 235 of FIG. 3A or FIG. 3B. In the example of FIG. 3B, downlink data is received 272 by the user plane function (UPF) 285 of the CN. The UPF 285 may then transmit a Data Notification 274 message to a session management function (SMF) 275. The SMF 275 (or another network function in the CN) may then transmit a Notification message 276 (such as an N11 message) to the MM 120 (e.g. AMF) that indicates which UE 100 is to receive the downlink data (thus the Notification message 276 is associated with downlink data). It is noted that in the example of FIG. 3B, a location service (LCS) is integrated with the MM 120. Alternatively, another network function within the CN may receive a copy of the Data Notification 274. If the UE 100 is reachable but in an IDLE state, then the MM 120 may transmit a paging request 278 to all APs 110 (e.g. eNodeBs or ANs 110) in a PA 115 for the UE 100. It should be noted that a desire or need to send the paging request 278 may alternatively be identified based upon MM 120 operational criteria as described above. The paging request 278 may also be derived from the update procedures in steps 215 to 230 of FIG. 3A, or independently therefrom.

The MM 120 transmits the paging request 278 only to access points in a PA 115. The MM 120 may identify the PA 115 as described above. In one example, the PA 115 includes at least a first AP 110 of a TA (e.g. AP-A 110-A in coverage area 111-A of $TA_1$) and the PA 115 omits at least a second AP 110 of the TA (e.g. the other APs 110 in the other coverage areas 111 of $TA_1$). Thus, the PA 115 may be based upon the TA (or TAL). In some examples, the PA 115 may be "smaller" than, or a subset of, the TA. In some examples, the PA 115 may include an AP 110 that is external to the TA. In some examples, the PA 115 may include at least a first AP 110 of a first TA and at least a second AP 110 of a second TA. In some examples, the PA 115 may further be based upon a mobility pattern such as a mobility model or mobility profile associated with a UE 100. The mobility pattern (i.e. the mobility profile or mobility model) may comprise mobility information such as a current location of the UE 100, a change in UE motion behaviour, and a TA boundary crossing by the UE 100. If the mobility pattern indicates a relatively fast UE motion behaviour, then the PA 115 may be defined to include only macro cells to limit signaling. If the mobility pattern indicates a relatively slow UE motion behaviour, then the PA 115 may be defined to include small cells near the last known location of the UE 100. If the mobility pattern of the UE 100 indicates a location where the UE 100 is typically located during a time period, the PA 115 may be defined to include cells near that location.

As described above, each eNodeB or AP 110 will broadcast a page 280 message receivable by UEs 100. While in the IDLE state, a UE 100 may periodically listen for and to process a page 280 message. If the page 280 message includes a reference to the UE 100, then the UE 100 may initiate a Service Request Procedure 282 to set up a session with the network to send and receive messages, including buffered and further downlink data 284.

Figure 4A:
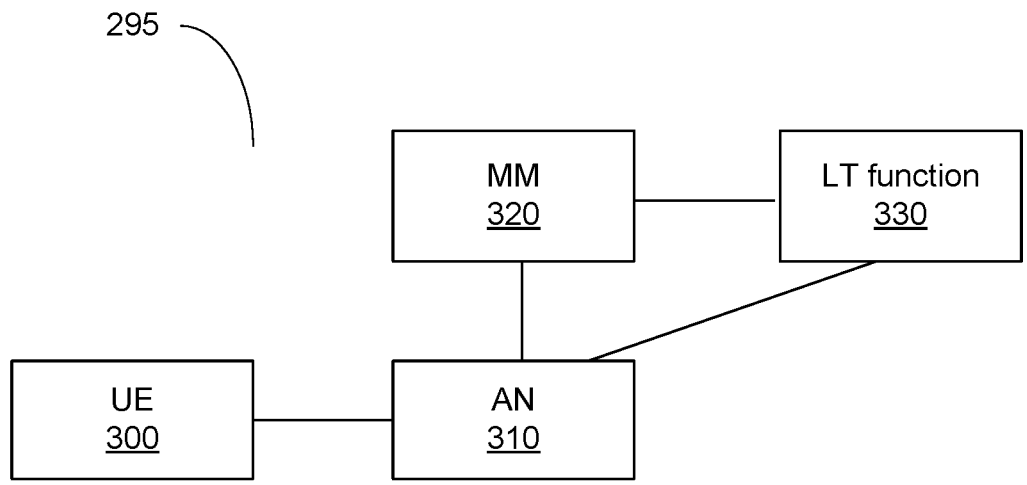
FIG. 4A illustrates an embodiment of a simplified network diagram for a location tracking system.

Referring to FIG. 4A, an embodiment of a simplified network diagram of a location tracking system 295 is presented. In the Figure, a UE 300 connects to an Access Network (AN) 310 (also referred to as a RAN 310) through one or more Access Points (APs) not illustrated in the figure. A mobility management (MM) entity 320 associated with the AN 310 is further in communication with a location tracking (LT) function 330. As noted above, in some embodiments, a location service (LCS) may be used to facilitate the location tracking (LT) function 330. The LT function 330 is further in communication with the AN 310 directly. In some embodiments, MM 320 can be instantiated on the same platform as AN 310, or it could be a function communicatively coupled to the AN 310. In this example, the MM 320 maintains a mobility pattern (i.e. mobility profile or mobility model) for the UE 100. In some embodiments, the LT function 330 is integrated within the MM 320 (e.g. as a function within the MM 320). In embodiments where the LT function 330 is a separate function from the MM 320, the mobility pattern may be maintained by either the LT function 330 or the MM 320 entity.

Figure 4B:
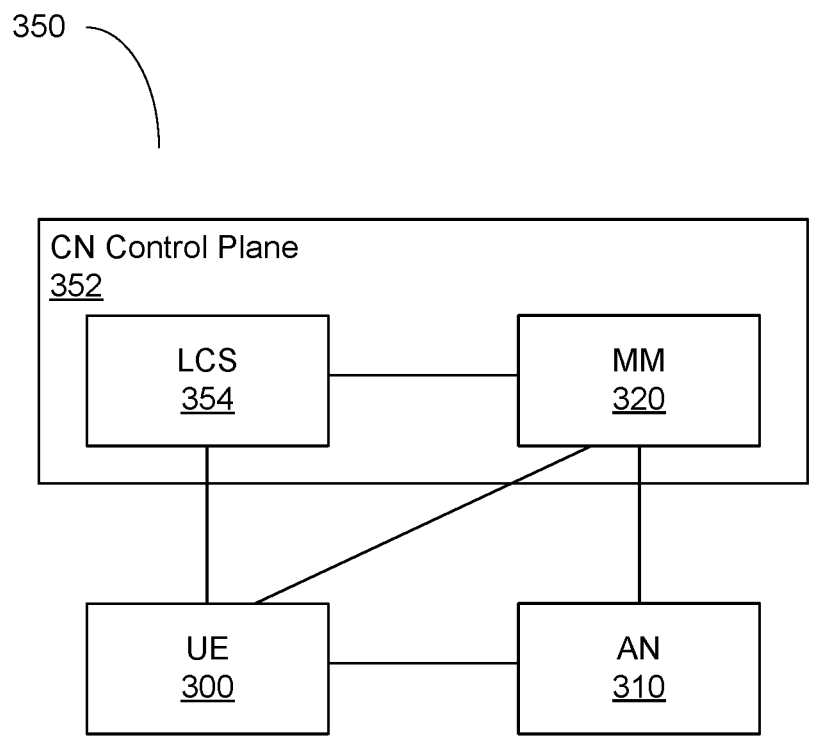
FIG. 4B is another simplified network diagram illustrating another example of a location tracking system.

FIG. 4B is another simplified network diagram illustrating another example of a location tracking system 350. The location tracking system 350 comprises a location service 354 connected to a MM 320 in a Core Network (CN) Control Plane 352. The LCS 354 may be the LT function 330 or another function in the CN control plane 352 that provides location services for the UE 300. The LCS 354 is also connected to the UE 300. The MM 320 is also connected to the UE 300 and to the access node (AN) 310. In this example, the MM 320 maintains the mobility pattern (i.e. mobility profile or mobility model) for the UE 300. In some embodiments, the LCS 354 may maintain the mobility pattern for the UE 300. It is understood that the MM 320 entity may comprise an AMF) of the network.

Figure 5A:
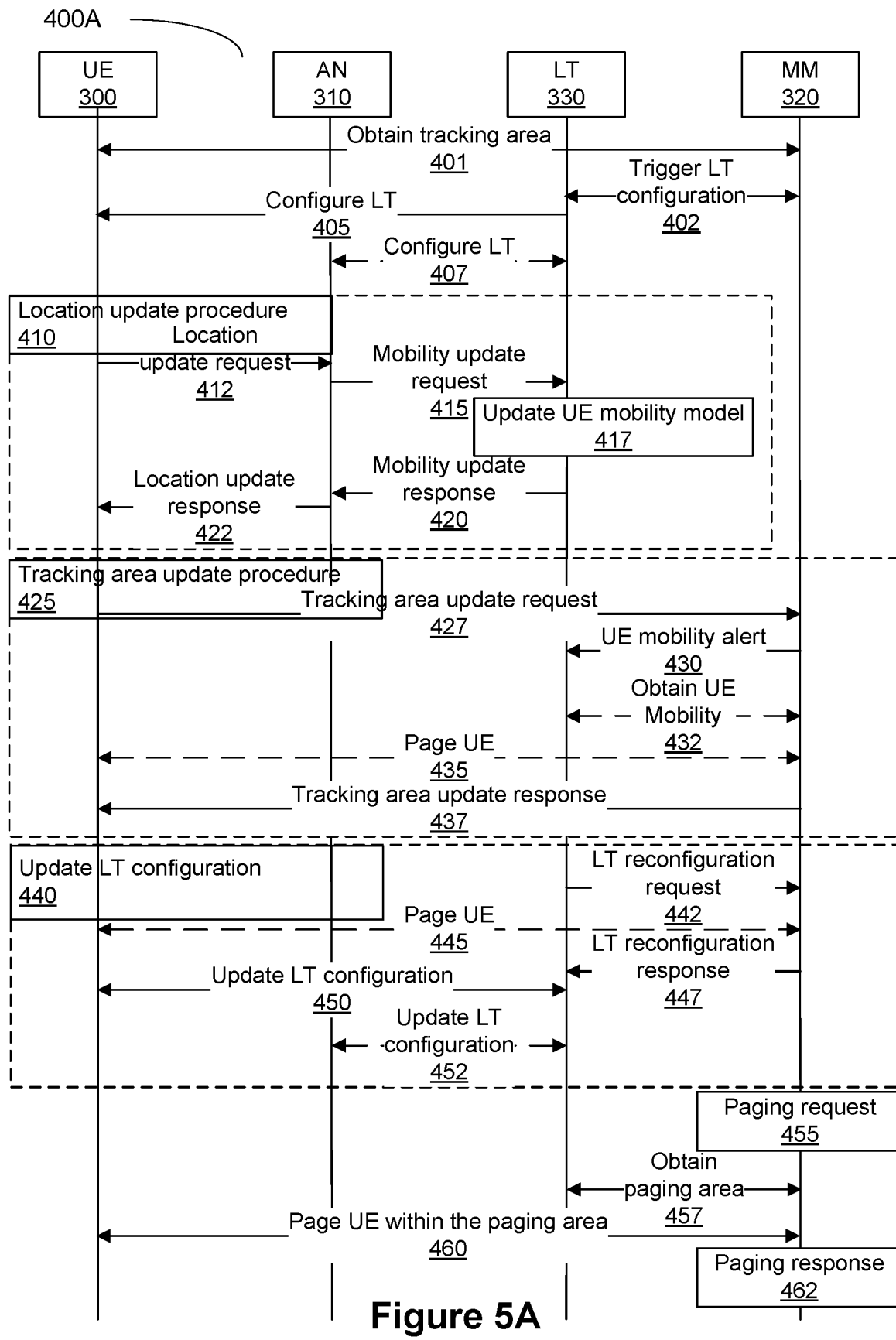
FIG. 5A is a signalling diagram illustrating an embodiment of a location tracking system.

Referring to FIG. 5A, a signalling diagram for the location tracking system 400A of FIG. 4 is presented. Steps 410, 425, 440 are non-sequential steps that occur as required to maintain the location tracking of the UE 300. In the example illustrated in FIG. 5A, the LT function 330 and MM entity 320 are separate entities. In some embodiments, the LT function 330 and MM entity 320 may be integrated together into an AMF (e.g. integrated within the MM 320) where the signals shown in FIG. 5A between the LT function 330 and MM 320 are internal procedures of the integrated function.

In step 401, the UE 300 obtains a tracking area(s) (TA) from the MM 320. The TA is defined by a list of APs 110 (or ANs 110) (e.g. a Tracking Area List (TAL)) that are available to service the UE 300 in the current TA. The TA may also be associated with a geographic boundary (such as a geographic grid).

In step 402, the MM 320 triggers location tracking configuration for the UE 300 with the LT function, by providing the TA to the LT function 330.

In step 405, the LT function 330 configures LT with the UE 300. The configuration may include, for instance, the LT function 330 identifying the LT method to be used and any associated parameters. The configuration may be different in the different parts of the TA. It will be understood that when reference is made to a function or node configuring another node, the configuring node may be generating a set of configuration parameters that are then transmitted to the node-to-be-configured in a configuration instruction.

In step 407, the LT function 330 configures LT with the AN 310 within the TA, if needed.

In step 410, when a location tracking event is triggered, a location update procedure may be initiated. The location tracking event may be triggered, for instance, from the expiry of a location update timer maintained by the UE 300. In step 412 of the location update procedure the UE 300 transmits a location update request to the AN 310 to update the UE location. The request may include UE location, for example, a geographic location obtained from the Global Positioning System (GPS). In step 415 after receiving the location update request, the AN 310 generates a mobility update request in accordance with the location update request and transmits the generated mobility update request to the LT function 330. The mobility update request may include, for instance, the UE's reported location (such as GPS coordinates) or the AP location (or AP ID) of the AP that connects the UE 300 to the AN 310. In step 417 the LT function 330 updates a mobility model of the UE 300, according to the mobility update request. In step 420 the LT function 330 forwards a mobility update response to the AN 310. In response to receiving the mobility update response in step 5.5, the AN 310 sends a location update response 422 to the UE 300.

When the UE is about to leave the TA, or when its mobility changes, the TA update procedure in step 425 can be triggered. In optional step 427, the UE 300 may identify the need for a TA update, and as a result sends a tracking area update request to the MM function 320. The tracking area update request may include UE's current location. In the alternative, in optional step 430, the LT function 330 may identify the need for a TA update, and send a mobility alert to the MM function 320 indicating a need for a tracking area update. The mobility alert may include, for instance, the UE's current location (estimated or reported). In step 432 the MM function 320 optionally obtains the UE mobility information from the LT function 330. In this aspect the MM function 320 may use the mobility information together with the UE's location to determine the tracking area update for the UE 300. In optional step 435 the MM function 320 pages the UE 300 when the MM 320 determines that the UE 300 is currently in the idle mode. In step 437 the MM function 320 provides the UE 300 with the tracking area update response.

The LT function 330 may decide to modify the current LT configuration and request for a LT configuration update in step 440. The decision to modify the current LT configuration may, in an aspect, be based upon a mobility or location change of the UE 300. In initial step of the LT configuration update the LT function 330 sends a LT reconfiguration request 442 to the MM function 320. In response to receiving the LT reconfiguration request the MM function 320 may page 445 the UE 300 if the MM 320 determines that the UE 300 is currently in the idle mode. In step 447 the MM 320 function sends a LT reconfiguration response to the LT function 330, triggering the LT function 330 to start to update LT configuration. The LT reconfiguration response 447 may include the current tracking area of the UE 300. In the case where the MM 320 pages the UE 300 in step 447, the LT reconfiguration response may include location and/or mobility information received from the UE 300 in response to the paging. In step 450 the LT function 330 updates the LT configuration with the UE 300. The updated configuration may include, for instance, the LT method to be used and any updated associated parameters. As with the initial location tracking configuration, the method and parameters may be different in the different parts of the TA. In optional step 452, the LT function 330 may configure LT with the AN 310 within the TA.

In step 455 a paging event is identified by the MM 320. The need to page the UE 300 may be in response to an external trigger, such as an external request, or may be in response to an internal trigger, such as a need for the MM 320 to obtain current location or mobility information from the UE 300.

In step 457 the MM 320 determines the paging area of the UE 300 according to the UE's tracking area and the UE's mobility information (including current location). The former is locally maintained; the UE's mobility information may be obtained from the LT function 330.

In step 460 the MM 320 instructs APs 310 (or ANs 310) within the paging area of the UE 300 to page the UE 300.

In step 462, in the event that the paging event was due to an external request, the MM 320 may send a paging response to the external network function that requested the UE paging.

Figure 5B:
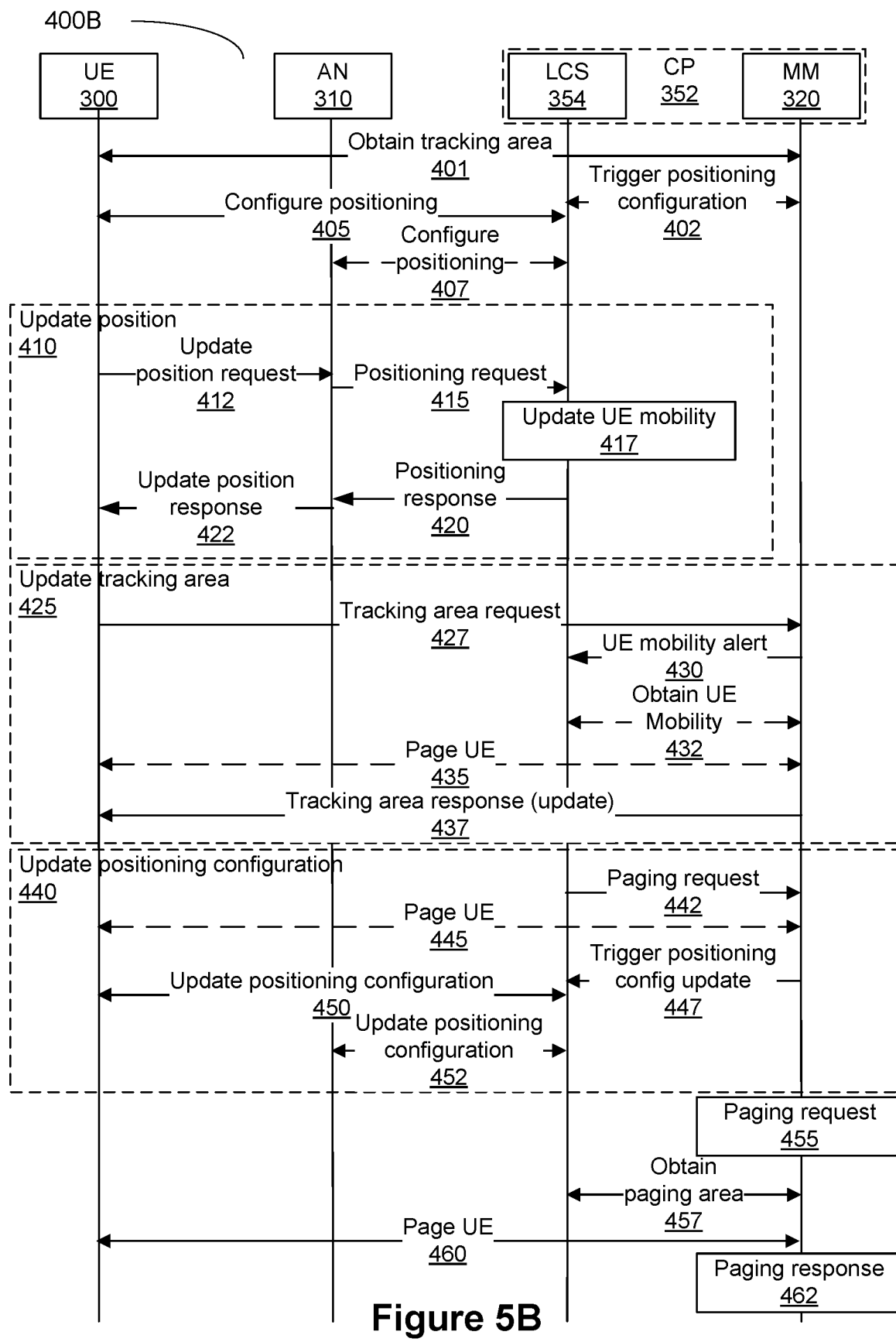
FIG. 5B is a message call flow diagram illustrating an example of a location tracking procedure.

FIG. 5B is a message call flow diagram illustrating another example of a location tracking procedure 400B. This procedure 400B is a variant of the location tracking procedure 400A of FIG. 5A. The location tracking procedure 400B shown in FIG. 3B also shows a location service (LCS) 354 separate from the MM 120 entity within the Control Plane (CP) 352 of the CN. While some method call steps in procedure 400B may have variant names as compared to procedure 400A, the steps themselves are similar and thus the same reference numerals are provided as in FIG. 5A. In procedure 400B, the mobility pattern is maintained at the LCS 354, in a similar manner that the mobility pattern is maintained at the LT function 330 in procedure 400A.

Figure 6:
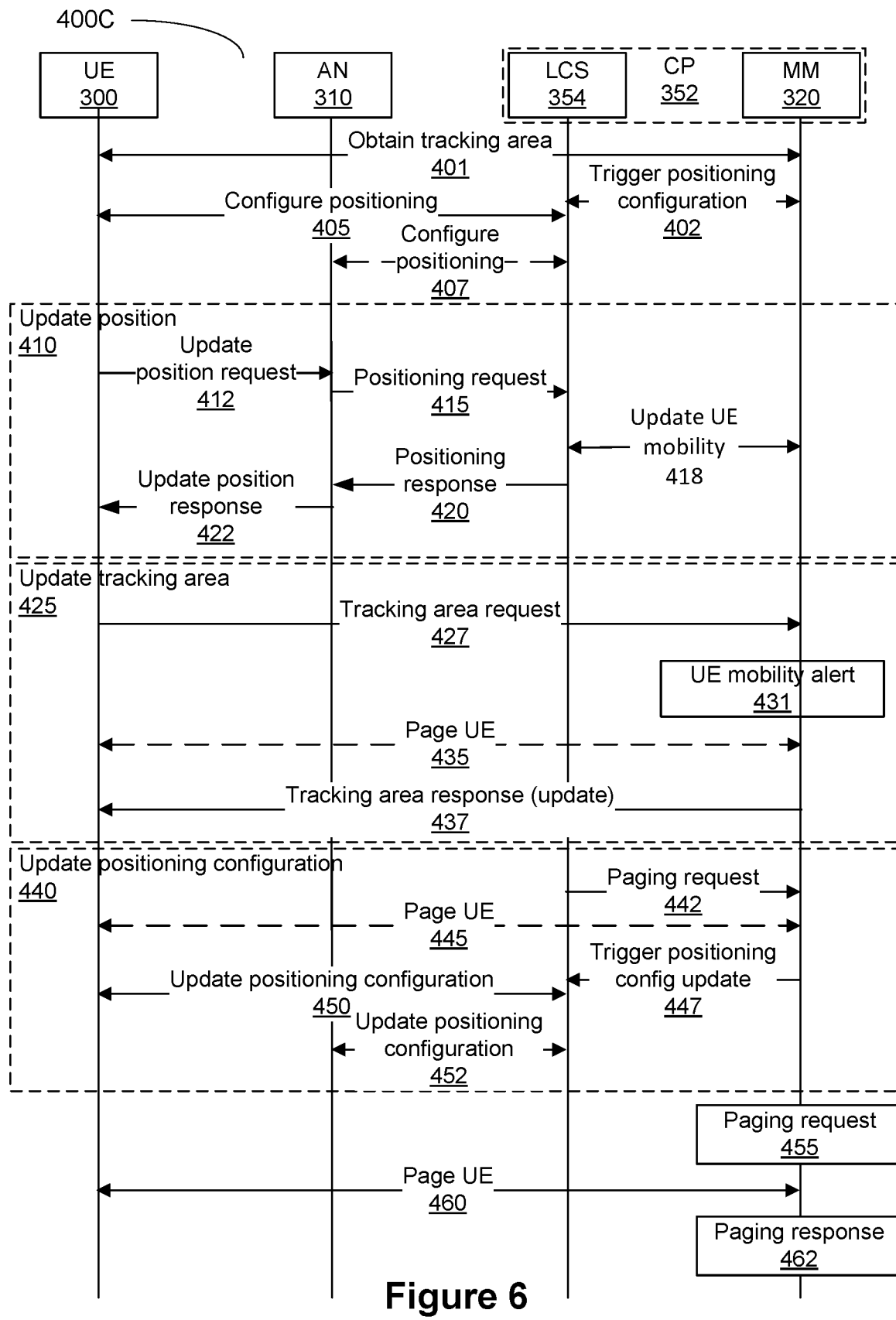
FIG. 6 is a message call flow diagram illustrating another example of a location tracking procedure.

FIG. 6 is a message call flow diagram illustrating another example of a location tracking procedure 400C. This procedure 400C is also a variant of the location tracking procedures 400A and 400B of FIGS. 5A and 5B. While some method call steps in procedure 400C may have variant names as compared to procedure 400A, the steps themselves are similar and thus the same reference numerals are provided as in FIG. 5A. In procedure 400C, the mobility pattern is maintained at the MM 120. One difference between procedure 400B and procedure 400C is that step 417 is replaced with step 418, where the MM 320 is performing the location tracking and mobility modeling. Thus, in step 418, the LCE 354 updates the UE mobility information (e.g. UE location) to the MM 320. Another difference between procedure 400B and procedure 400C is that steps 430 and 432 are replaced with step 431, where the MM 320 is performing the location tracking and mobility modeling. Thus, in step 431, the MM 320 is already aware of the UE mobility and may identify the UE mobility alert locally (without involving the LCS). Step 457 is omitted in procedure 400C.

The Mobility Pattern (MP) of the UE, also referred to above as a mobility model (or mobility profile) of the UE 100, describes the expected mobility of the UE 100 within a certain time window in the future. The MP may be expressed by a series of <time, location> pairs, depicting the expected/predicted temporal and spatial presence of the UE 100. 'Location' can be, for example, a geographic location, an AN ID, a cell ID or other information locating the UE 100 relative to the topology of the network. The number of <time, location> pairs defines the size of the MP. The MP can be generated/updated based on the location reports from the UE 100 during location tracking.

If the UE 100 has scheduled mobility, for example, the UE 100 is associated with an entity that has a generally known route, such as a bus UE, a train UE, a robot UE, etc., then the AMF (such as an AMF containing MM 120) may derive or determine the MP in accordance with the UE's mobility schedule. The AMF may also obtain the MP through a statistical analysis of historical location data (of the UE 100 and/or the UEs of the same type). In addition, the AMF may learn or refine the MP in the near future based on live location reports collected through a UE-assisted MP Update (UE-MPU).

A UE-MPU procedure can be triggered by the UE 100 at any or all of: the end of the future time window, when a UE-MPU timer expires, and when the mobility prediction error (e.g. the delta between a predicted location and an actual measured location) exceeds a threshold value. Mobility prediction error can be measured by the difference between the predicted value and the true value, for example, the difference of predicted time of presence at a location and actual time of presence at the location, or the difference of predicted location of presence at a time instance and actual location of presence at the time instant, or the difference between the prediction and the actual value in a scaled L2-norm of 'time' and 'location'.

In order for the UE 100 to know the prediction error, the UE 100 can generate the same MP for itself as the AMF does, using the same data available to the AMF. This implies that the UE 100 runs the same MP generation algorithm, with the same input, as the AMF. There may be a synchronization of the MP generation algorithm between the UE 100 and AMF. This synchronization may include the UE 100 indicating a set of MP generation algorithms that it supports and being provided with an indication of which of the supported algorithms to be used, in other embodiments the algorithm itself may be transmitted to the UE 100. This may be received by the UE 100 at any of a number of different events, including when the UE 100 registers with the network, or subsequent to a handover operation. In some embodiments, an MP generated by the AMF could be forwarded to the UE 100.

When one-level location tracking is used, for example when a non-5G RAN is serving the UE 100, the UE 100 participates in UE-MPU directly. When two-level location tracking is used, for example when 5G RAN is serving the UE 100, UE-MPU may be split into RAN UE-MPU, which is up to the RAN group to define, and core network (CN) UE-MPU. In the CN UE-MPU procedure, the AN 110 provides UE location reports to the AMF on the UE's behalf. The AMF determines the UE-MPU triggering conditions for the UE 100, i.e. the UE-MPU timer value and the prediction error thresholds, and configures them into the UE 100, in the case of one-level UE-MPU, or the AN 110, in the case of two-level UE-MPU. It should be understood that although the current discussion is based on the use of a 5G RAN, the RAN 105 of any network could be used in its place.

In an example in which the UE's MP is based on cell ID or AN ID, UE-MPU may happen when the UE 100 has entered an idle mode. In another example, the UE's MP is based on geographic location, in which case UE-MPU can happen when the UE 100 is in either of the connected mode and/or the idle mode. When the UE 100 is idle, if the UE-MPU and TA update are both required at the same time, the two procedures can be integrated.

Figure 7:
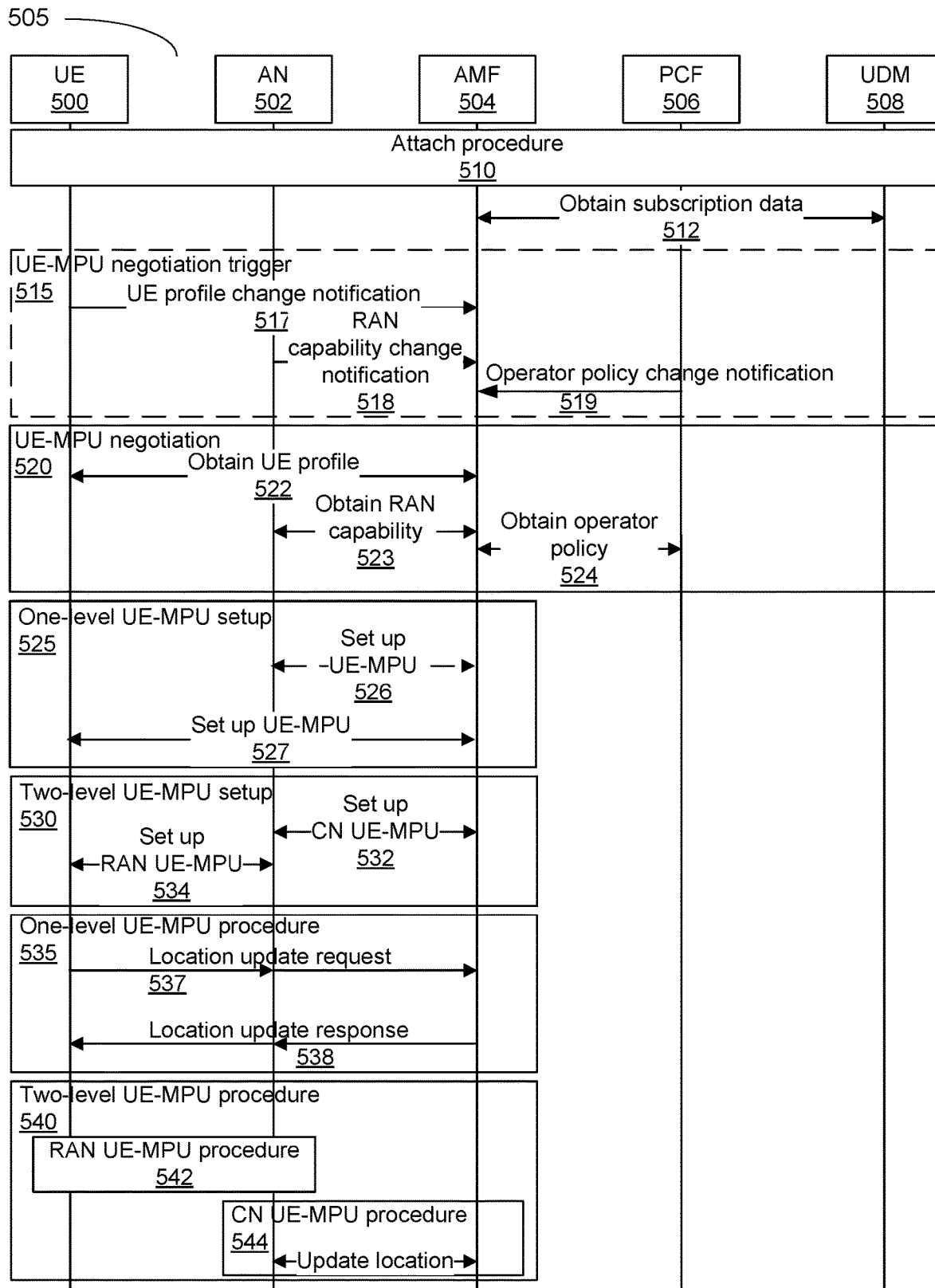
FIG. 7 is a signalling diagram illustrating an embodiment for maintaining a mobility pattern.

Referring to FIG. 7, a signalling diagram illustrating an embodiment of a UE-MPU procedure is presented.

Prior to starting the UE-MPU procedure, it is assumed that the attach procedure 510 has completed.

In step 512 the AMF 504 obtains user subscription data.

Step 515, shown with a stippled outline, is not a successive step in the tracking procedure. Rather step 515 is an operational step that may occur as necessary depending upon whether step-specific criteria are met. Also, as shown in FIG. 7, when the operational step 515 is performed, it can vary depending on circumstances of the negotiation trigger.

In optional step 515 AMF 504 receives an UE-MPU negotiation trigger. In one embodiment, the trigger is a UE profile change notification 517 from the UE 500. In another embodiment, the trigger is a RAN capability change notification 523 from the AN 502. In another embodiment, the trigger is an operator policy change notification 519 from a Policy Control Function (PCF) 506.

In step 520 the AMF 504 decides to initiate the MPU negotiation procedure. In step 522, the AMF 504 obtains UE profile, which may include UE mobility schedule information. In step 523, the AMF 504 obtains RAN capability from the AN 502. For example, this can include information about whether the AN 502 is able to perform RAN level tracking. In step 524, AMF 504 obtains the operator policy from the PCF 506. This can include, for example, details on the granularity of the MP.

The AMF 504 determines the UE-MPU configuration according to the information obtained through the above operations, and triggers the set up of the UE-MPU. The set up steps differ depending on whether a one-level UE-MPU is set up or a two-level UE-MPU is set up.

Step 525 is performed in setting up a one-level UE-MPU. In step 526 the AMF 504 informs the AN 502 about the MPU configuration, for example, whether to assist the UE-MPU with its own location. In step 527, the AMF 504 informs the UE 500 about the MPU configuration, for example, the UE-MPU triggering conditions and whether to include geographic location in the location report.

Step 530 is performed in setting up a two-level UE-MPU. In step 532, the AMF 504 informs the AN 502 about the CN UE-MPU configuration, for example, the UE-MPU triggering conditions. In step 534, the AN 502 configures RAN UE-MPU according the CN MPU configuration.

In steps 535 and 540 the UE-MPU procedure takes place. The steps in this procedure differ depending on whether a one-level UE-MPU is set up 535 or a two-level UE-MPU is set up 540.

Referring to step 535 for one-level UE-MPU, the first operation is step 537, which occurs when the UE-MPU triggering conditions are met and the UE 500 requests the AMF 504 to update the location of the UE 500. When forwarding the request to the AMF 504, the AN 502 may also provide its own location information depending on the UE-MPU configuration. In step 538, the AMF 504 updates the MP according to the location report and responds to the UE 500 via the AN 502.

Referring to step 540 for two-level UE-MPU, the first operation is step 542, the RAN UE-MPU procedure takes place between the UE 500 and the AN 502. In step 544, when the CN UE-MPU triggering conditions are met, the AN 502 on behalf of the UE 500 reports location to the AMF 504, which accordingly updates the MP.

Figure 8A:
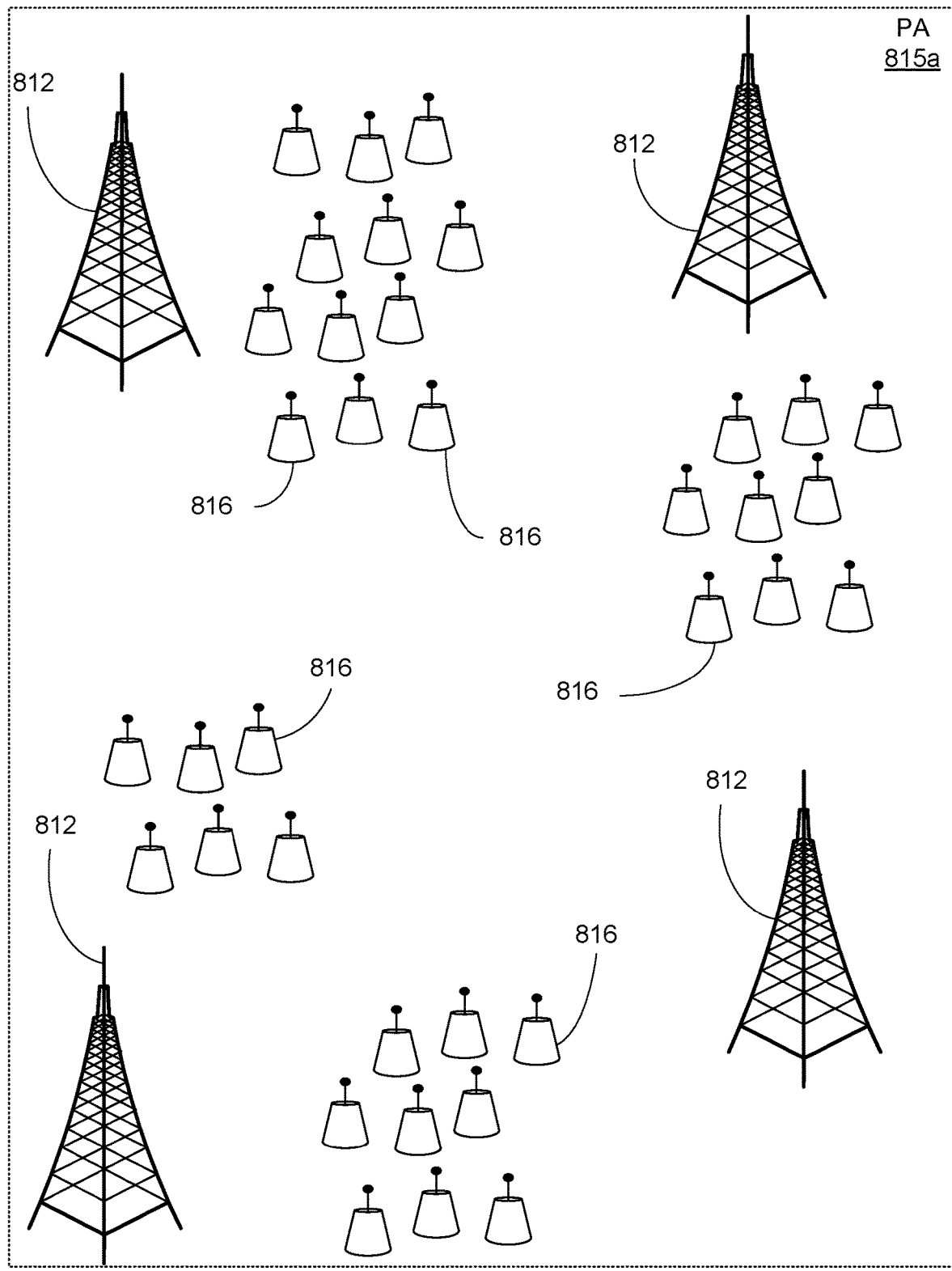
FIG. 8A is a block diagram illustrating an example of a paging area.
Figure 8B:
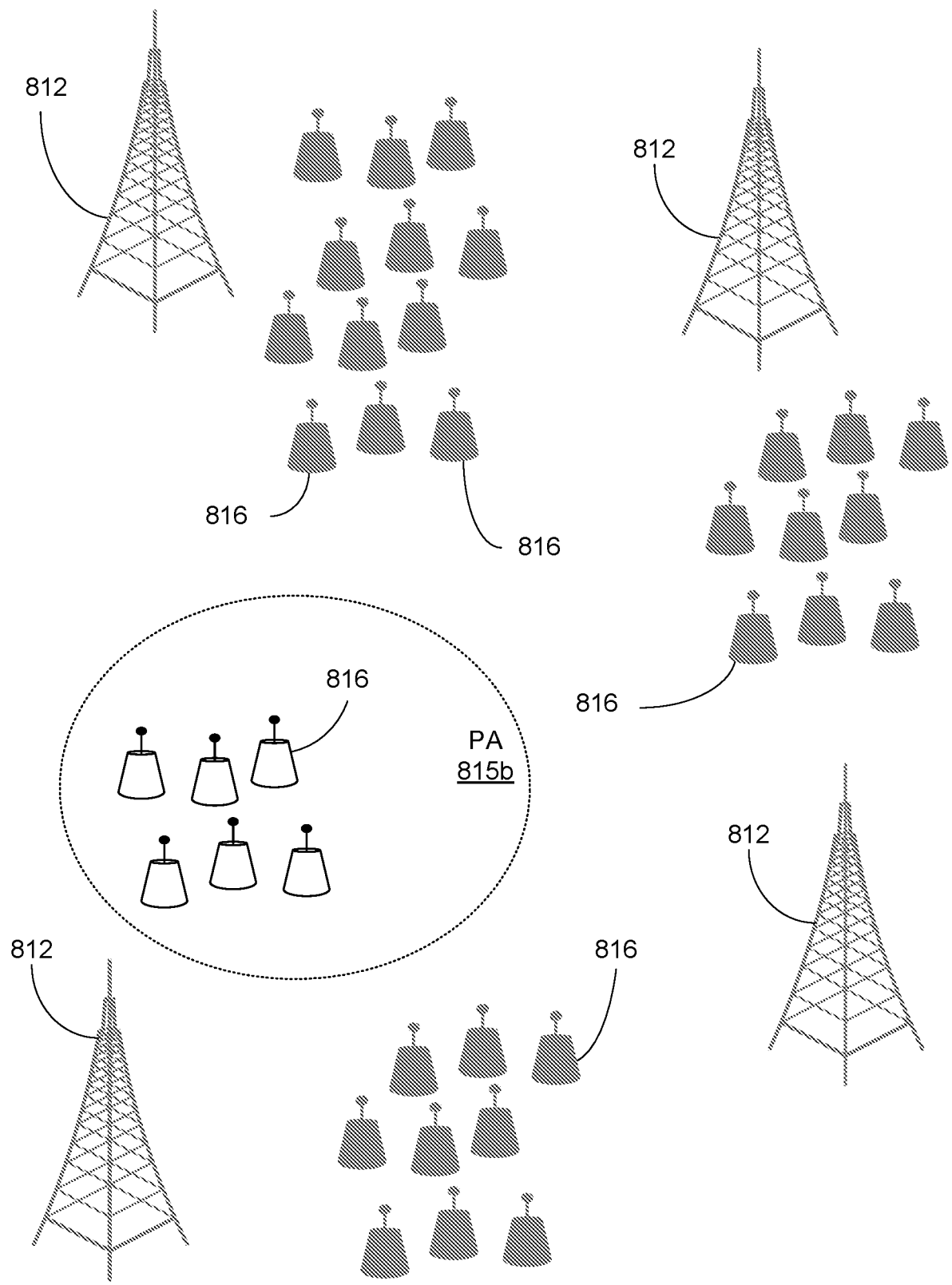
FIG. 8B is a block diagram illustrating another example of a paging area.
Figure 8C:
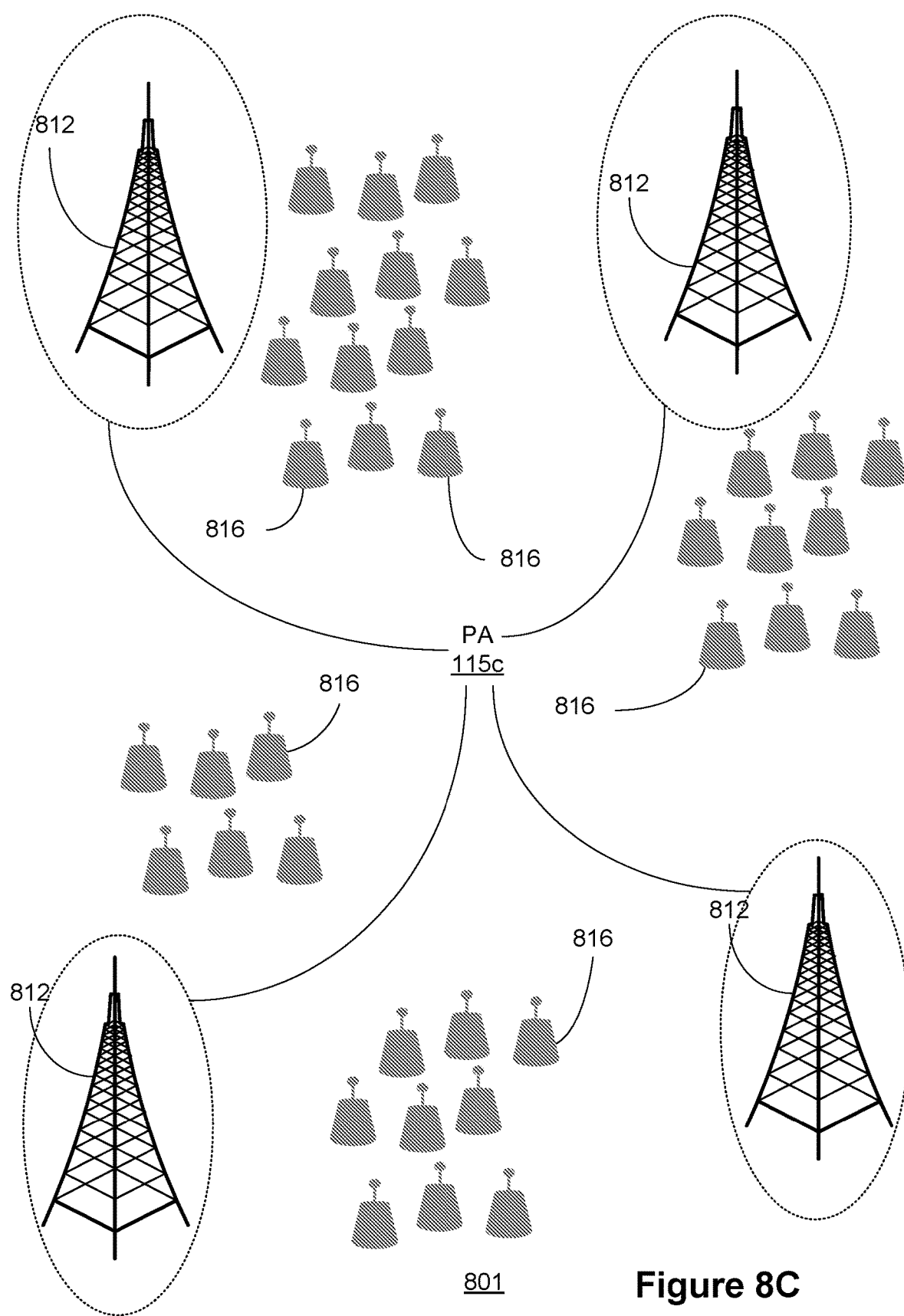
FIG. 8C is a block diagram illustrating another example of a paging area.

FIGS. 8a through 8c provide for other embodiments of PAs from PA 115. FIG. 8a is a block diagram illustrating an example of a TA 801, that includes macro cells 812 and small cells 816. In a network, the macro cells 812 provide broad coverage, and the small cells 816 are typically clustered so that they can provide coverage in dense deployment scenarios (e.g. in an office building). An example of a TAL may be defined to list all of the cells as shown in FIG. 8a.

In some embodiments, a PA may comprise any combination of any number of macro cells 812 and small cells 816. Such combinations may include only macro cells 812, only small cells 816, only cells of a certain type of wireless technology, a combination of at least one macro cell 812 and at least one small cell 816, a combination of cells from different wireless technologies or access technologies, or a combination of cells operating at different frequencies. PA 815a may include at least one coverage area not shown, but includes all the coverage areas of TA 801. As noted above, the coverage areas in a PA does not have to be geographically or topologically contiguous. It is understood that for two coverage areas to be topologically contiguous, the two coverage areas may share a common AP 810, or at least one APs 810 in one of the two coverage areas is linked with another AP 810 in the other coverage area.

If a UE 800 enters an IDLE state after being located in the building for a period of time i.e. a state of low mobility, the PA may be defined to be restricted to a small number of small cells. FIG. 8b illustrates an example of a PA 815b defined to include only a set of small cells, such as small cells that clustered to provide coverage in a building. For example, the mobility model for the UE (not shown) may indicate that during a time period (e.g. business hours) the UE is likely to be located on certain floors of an office building and in a state of low mobility. While there may be macro cells and other small cells that provide coverage to the entire office building, one PA (e.g. PA 815b) may be defined to include only the small cells that provide coverage for those floors of the office building. In another embodiment, the mobility pattern may simply indicate that the UE has been largely stationary with respect to the network topology, and as such is likely to remain within a limited area. As such, the small cells nearest the last known location of the UE may be defined as the PA (e.g. PA 815b)

In another example, the mobility model for a UE 800 may indicate that the UE 800 may be highly mobile (e.g. have relatively fast motion behaviour such as may be observed if the UE 800 is in a motor vehicle travelling on a highway). A UE 800 in the IDLE state may have last been connected with the network while travelling on the highway and may have been within coverage of one or more macro cells and several small cells from buildings or other structures near the location of the vehicle on the highway. Because the motion behaviour of the UE 800 in its mobility model indicates that the UE 800 was travelling at a speed in excess of a threshold at the time it transitioned to the IDLE state, the UE 800 may no longer be within range of the small cells nearest the UE 800 location prior to the transition to IDLE. As such, a PA 815c may be defined to only include macro cells within range of the last known location of the UE 800, or a predicted location of the UE 800 based on the mobility model of the UE 800. Thus, this example limits the paging request signaling to the macro cells even though there may be many small cells within the same geographic coverage area. FIG. 8c is a block diagram illustrating a PA 815c that includes only the macro cells 812 shown in FIG. 8a. For example, if PA 815a comprises the macro cells and small cells within range of the UE 800 travelling on a highway described above, then PA 815c comprises only the macro cells in that example.

Also disclosed herein, in an implementation, a method for tracking a location of a UE connected to a network is provided. The method may include a mobility management entity available on the network: sending a current tracking area composed of a tracking area list of radio access nodes to the UE; establishing a mobility model for the UE, the mobility model based on the tracking area and a selected location tracking method; transmitting location tracking configuration instructions to at least one of the UE and the network node; and, receiving location tracking information from the at least one of the UE and the network node and updating the mobility model based on the received location tracking information. In an aspect, the transmitting location tracking configuration instructions comprises transmitting location tracking configuration instructions to an access node for forwarding to the UE and for configuring the access node. The transmitting location tracking configuration instructions comprises transmitting location tracking configuration instructions to an access node for forwarding to the UE and for configuring the access point. The method further comprises receiving an update request from the UE. The update request from the UE may comprise a time instance at which a location is to be measured and a measured UE location.

Also disclosed herein, in an implementation, a method of paging a UE connected to a wireless network is provided. The location of the UE may be tracked according to the above tracking method. The method of paging may include the mobility management entity: identifying a paging area composed of a paging area set of radio access nodes from the tracking area list of radio access nodes based upon the current tracking area, the received location tracking information, and the mobility model; and, paging the UE in the paging area. Before the paging area is identified, the method further comprises identifying a need to page the UE. The need to page the UE is identified based upon operational criteria of the mobility management entity. The operational criteria comprise one of: a) a location update procedure, b) a tracking area update procedure, or c) a location tracking configuration update procedure. The need to page the UE is identified in response to receiving a request sent to the mobility management entity by another network function operative on the network.

Also disclosed herein, in an implementation, a method for maintaining a mobility pattern of a UE connected to a network comprising a core AMF of the network is provided. The method comprises receiving UE location reports where each UE location report is expressing a time and location pair for that UE, and deriving the mobility pattern based on the UE location reports, or a UE mobility schedule provided by the UE or a third party. The mobility pattern describes an expected mobility of the UE within a future time window. The method may further comprise comparing a received UE location report with an existing mobility pattern for the UE to produce a mobility prediction error, and updating the derived mobility pattern when the mobility prediction error exceeds a threshold prediction error value. The method may further comprise comparing a received UE location report with an existing mobility pattern for the UE to produce a mobility prediction error, and updating either a mobility pattern update configuration or a mobility pattern generation method when the mobility prediction error exceeds a threshold prediction error value.

Also disclosed herein, in an implementation, a method for maintaining a mobility pattern of a User Equipment (UE) connected to a network is provided. The method comprises the UE generating UE location reports, each UE location report expressing a time and location pair for that UE, and deriving the mobility pattern based on the UE location reports or a UE mobility schedule provided by the UE or a third party. The mobility pattern describes an expected mobility of the UE within a future time window. The method may further comprise comparing a generated UE location report with an existing mobility pattern for the UE to produce a mobility prediction error, and updating the derived mobility pattern when the mobility prediction error exceeds a threshold prediction error value. The method may further comprise updating the derived mobility pattern at the end of either the future time window or expiry of a mobility pattern update timer. The UE location reports are received from the UE or from an access node (AN). The method may further comprise determining at least one mobility pattern update triggering condition for the UE, and providing the at least one mobility pattern update triggering condition to at least one of the UE and an access node (AN).

Also disclosed herein in an implementation, a method for maintaining a mobility pattern of a User Equipment (UE) connected to a network is provided. The method comprises the UE generating the mobility pattern based on a series of UE location reports, each UE location report comprising a location and data pair, comparing the generated mobility pattern with future UE location reports to produce a mobility prediction error, and updating the derived mobility pattern when the mobility prediction error exceeds a threshold prediction error value. The method may further comprise the UE providing the generated mobility pattern to the network. The threshold prediction error value is provided to the UE by the network.

Also disclosed herein, in an implementation, a method for maintaining a mobility pattern of a User Equipment (UE) connected to a network is provided. The method comprises a core access and mobility function (AMF) of the network receiving a mobility pattern update negotiation trigger, and initiating a mobility pattern update negotiations procedure based on the received mobility pattern update negotiation trigger. The mobility pattern update negotiation trigger comprises any one of: a UE profile change notification received from the UE, a radio access network capability change notification from an access node connecting the UE to the network, and an operator policy change notification received from a policy control function (PCF) operative on the network. The mobility pattern update negotiation procedure comprises one of: informing an access node (AN) connecting the UE to the network of the core network mobility pattern update configuration or updated mobility pattern generation method for that UE, and informing the UE of the updated mobility pattern update configuration or updated mobility pattern generation method.

Figure 9:
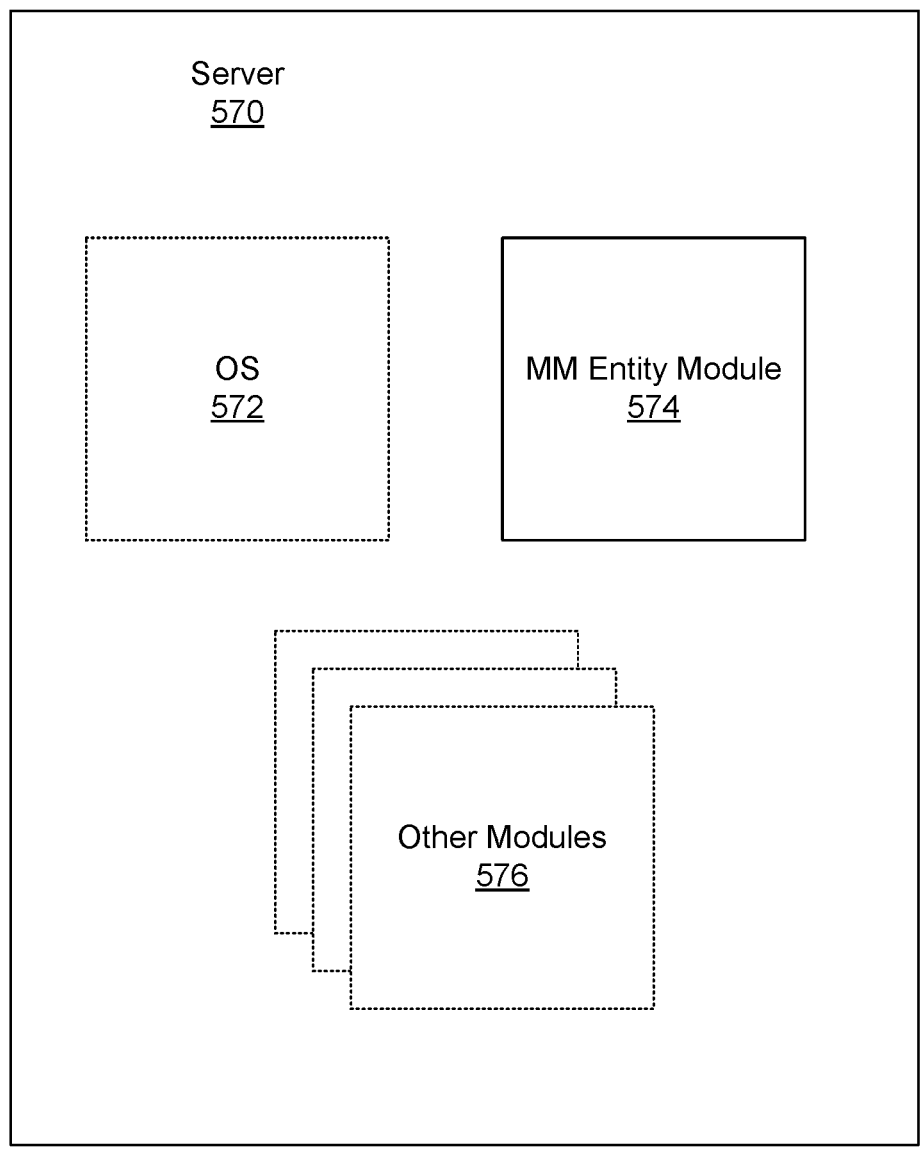
FIG. 9 is a block diagram illustrating an example of a server located on the core network that implements a MM entity.

FIG. 9 is a block diagram illustrating an example of a server 570 located on the core network that implements a MM entity 120, 320. The server 570 comprises a MM entity module 574 that implements the MM entity 120, 320, and may optionally comprise an operating system 572, and other modules 576 used by the server 570 for other purposes.

Figure 10:
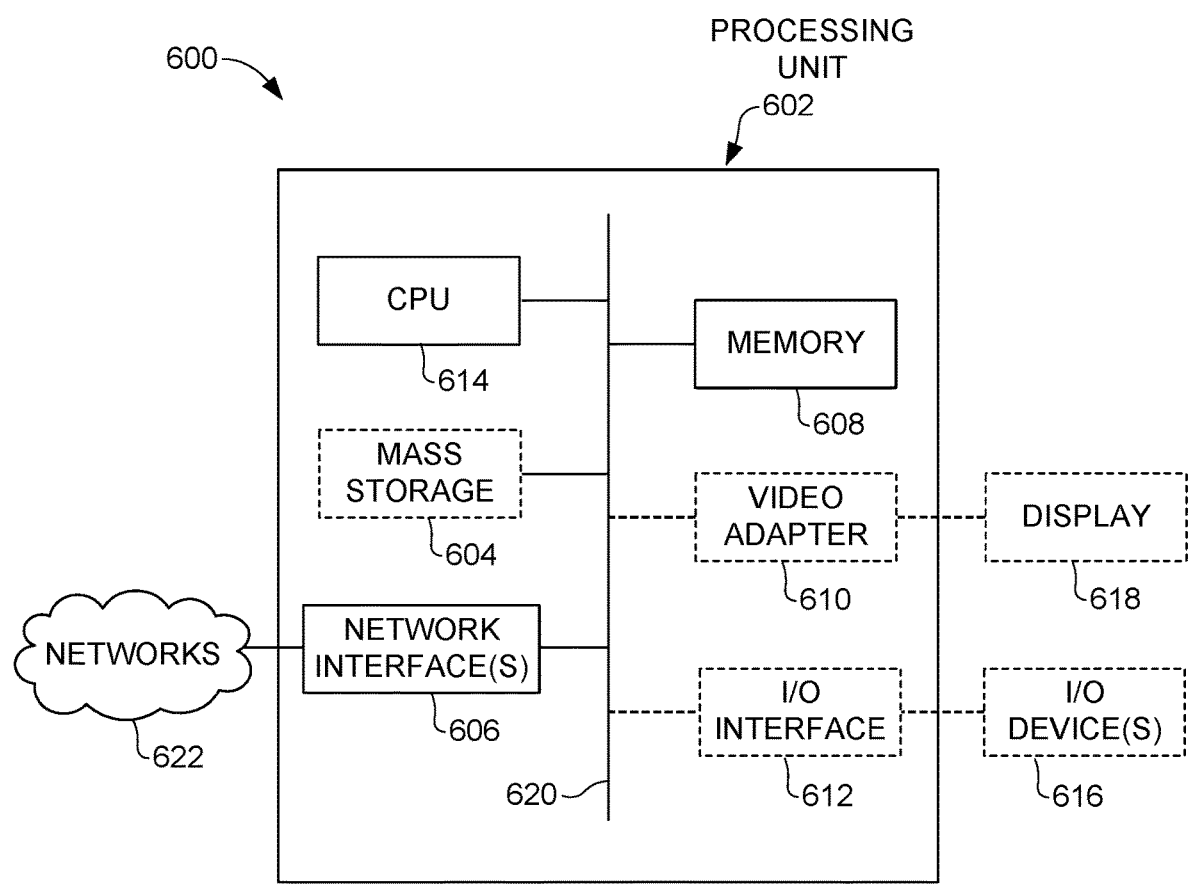
FIG. 10 is a block diagram illustrating an embodiment of a computing system.

FIG. 10 is a block diagram of a computing system 600 that may be used for implementing the devices and methods disclosed herein. In particular, the network nodes may each include one or more computing systems 600. The network functions described above may be instantiated by execution on one or more computing systems 600. In some aspects, a network function may be instantiated across a plurality of computing systems 600 across a plurality of geographic locations. The UE described above may comprise a computing system 600 adapted to perform the methods described herein.

Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 600 includes a processing unit 602. The processing unit 602 typically includes a central processing unit (CPU) 614, a bus 620 and a memory 608, and may optionally also include a mass storage device 604, a video adapter 610, and an I/O interface 612 (shown in dashed lines). The computing system 600 may further include one or more network interface(s) 606 for connecting the computing system 600 to communication networks 622.

The CPU 614 may comprise any type of electronic data processor, and may include one or more cores or processing elements. The memory 608 may comprise any type of non-transitory system memory such as static random access memory (SRAM), dynamic random access memory (DRAM), synchronous DRAM (SDRAM), read-only memory (ROM), or a combination thereof. In an embodiment, the memory 608 may include ROM for use at boot-up, and DRAM for program and data storage for use while executing programs. The bus 620 may be one or more of any type of several bus architectures including a memory bus or memory controller, a peripheral bus, or a video bus.

The mass storage 604 may comprise any type of non-transitory storage device configured to store data, programs, and other information and to make the data, programs, and other information accessible via the bus 620. The mass storage 604 may comprise, for example, one or more of a solid state drive, hard disk drive, a magnetic disk drive, or an optical disk drive.

The video adapter 610 and the I/O interface 612 provide optional interfaces to couple external input and output devices to the processing unit 602. Examples of input and output devices include a display 618 coupled to the video adapter 610 and an I/O device 616 such as a touch-screen coupled to the I/O interface 612. Other devices may be coupled to the processing unit 602, and additional or fewer interfaces may be utilized. For example, a serial interface such as Universal Serial Bus (USB) (not shown) may be used to provide an interface for an external device. Alternatively, the computing system 600 may rely upon the network interface(s) 606 for connection to available mass storage(s), video adapter(s) 610, and I/O interface(s) 612 available on the networks 622.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the claims.

We claim:

1. A method comprising:
  periodically updating, by a mobility management function, a respective mobility pattern of a User Equipment (UE), the mobility pattern based on a first mobility pattern generation algorithm selected from among a set of at least two different mobility pattern generation algorithms and including one or more of an indication of a location of the UE as a function of time and an indication of a degree of mobility of the UE as a function of time,
  wherein updating the respective mobility pattern of the UE comprises:
    receiving a mobility pattern based on the first mobility pattern generation algorithm;
    determining, by the mobility management function, based on the received mobility pattern of the first mobility pattern generation algorithm, the UE to be in one of a plurality of mobility states;
    selecting, by the mobility management function, based on the determined mobility state of the UE, a second mobility pattern generation algorithm from among the set of at least two different mobility pattern generation algorithms;
    sending, by the mobility management function, an instruction to the UE to configure location tracking and reporting of the UE, in accordance with the second mobility pattern generation algorithm;
    subsequently receiving, from the UE, location reports including location tracking information of the UE in accordance with the second mobility pattern generation algorithm; and
    updating the respective mobility pattern of the UE using the received location tracking information of the UE;
  the method further comprising:
    receiving, by the mobility management function, a notification message associated with downlink data destined for the UE; and
    transmitting, by the mobility management function, a paging request only to Access Points (APs) of a predetermined paging area (PA) associated with the UE, the Access Points of the predetermined paging area being selected in accordance with the updated mobility pattern of the UE.

2. The method as claimed in claim 1, wherein the indication of a location of the UE as a function of time comprises a plurality of location and time pairs, each location and time pair being indicative of a location of the UE at a particular time.

3. The method as claimed in claim 1, wherein the indication of a degree of mobility of the UE as a function of time comprises at least one speed and time pair, each speed and time pair being indicative of a speed of the UE at a particular time.

4. The method as claimed in claim 1, wherein:
  the mobility pattern of the UE indicates that the UE was in a low mobility state at a time the UE entered an IDLE state; and,
  based on the mobility pattern of the UE, the Access Points of the predetermined paging area are selected to include small cell APs.

5. The method as claimed in claim 1, wherein:
  the mobility pattern of the UE indicates that the UE was in a high mobility state at a time the UE entered an IDLE state, wherein the IDLE state comprises:
    the UE periodically listening to and processing a page message addressed to it at the defined paging occasion, a paging occasion consisting of a periodic network broadcast to all UEs located within a tracking area;
  based on the mobility pattern of the UE, the Access Points of the predetermined paging area are selected to include only macro cell APs.

6. The method as claimed in claim 5, wherein the Access Points of the predetermined paging area include at least one Access Point associated with a predicted current location of the UE.

7. The method as claimed in claim 1, wherein periodically updating the respective mobility pattern of the UE comprises updating the respective mobility pattern of the UE in response to receipt, by the mobility management function, of any one or more of:

a mobility update request from an access network;
a TA boundary crossing notification from a location tracking function;
a tracking area request from the UE; and
a positioning request from the UE.

8. The method as claimed in claim 1, wherein the location tracking information of the UE comprises a current location of the UE.

9. The method as claimed in claim 8, wherein the current location of the UE includes any one or more of:
a Global Positioning System (GPS) coordinate; and
an identifier of an Access Point connected to the UE.

10. The method as claimed in claim 1, wherein updating the respective mobility pattern of the UE further comprises:
sending, by the mobility management function, an instruction to an access network to configure mobility tracking and reporting of the UE, in accordance with the selected mobility pattern generation algorithm;
subsequently receiving, from the access network, mobility update reports including mobility tracking information of the UE; and
updating the respective mobility pattern of the UE using the selected mobility pattern generation algorithm and the received mobility tracking information of the UE.

11. The method as claimed in claim 10, wherein the mobility tracking information of the UE comprises any one or more of:
an identifier of an Access Point connected to the UE; and
a detected change in mobility behaviour of the UE.

12. A mobility management function comprising: at least one processor;
a non-transitory computer readable storage medium including software instructions configured to control the at least one processor to perform steps of:
periodically updating a respective mobility pattern of a User Equipment (UE), the mobility pattern based on a first mobility pattern generation algorithm selected from among a set of at least two different mobility pattern generation algorithms and
including one or both of an indication of a location of the UE as a function of time and an indication of a degree of mobility of the UE as a function of time,
wherein updating the respective mobility pattern of the UE comprises:
receiving a mobility pattern based on the first mobility pattern generation algorithm;
determining, based on the received mobility pattern of the first mobility pattern generation algorithm, the UE to be in one of a plurality of mobility states;
selecting, by the mobility management function, based on the determined mobility state of the UE, a second mobility pattern generation algorithm from among the set of at least two different mobility pattern generation algorithms;
sending, by the mobility management function, an instruction to the UE to configure location tracking and reporting of the UE, in accordance with the second mobility pattern generation algorithm;
subsequently receiving, from the UE, location reports including location tracking information of the UE in accordance with the second mobility pattern generation algorithm; and
updating the respective mobility pattern of the UE using the received location tracking information of the UE; and wherein the non-transitory computer readable storage medium is configured to control the at least one processor to perform the further steps of:
receiving a notification message associated with downlink data destined for the UE; and
transmitting a paging request only to Access Points (APs) of a predetermined paging area (PA) associated with the UE, the Access Points of the predetermined paging area being selected in accordance with the updated mobility pattern of the UE.

13. The mobility management function as claimed in claim 12, wherein:
the mobility pattern of the UE indicates that the UE was in a low mobility state at the time the UE entered an IDLE state, wherein the IDLE state comprises:
the UE periodically listening to and processing a page message addressed to it at the defined paging occasion, a paging occasion consisting of a periodic network broadcast to all UEs located within a tracking area; and
based on the mobility pattern of the UE, the Access Points of the predetermined paging area are selected to include small cell APs.

14. The mobility management function as claimed in claim 12, wherein:
the mobility pattern of the UE indicates that the UE was in a high mobility state at the time the UE entered an IDLE state, wherein the IDLE state comprises:
the UE periodically listening to and processing a page message addressed to it at the defined paging occasion, a paging occasion consisting of a periodic network broadcast to all UEs located within a tracking area; and
based on the mobility pattern of the UE, the Access Points of the predetermined paging area are selected to include only macro cell APs.

15. The mobility management function as claimed in claim 14, wherein the Access Points of the predetermined paging area include at least one Access Point associated with a predicted current location of the UE.

16. The mobility management function as claimed in claim 12, wherein periodically updating the respective mobility pattern of the UE comprises updating the respective mobility pattern of the UE in response to receipt, by the mobility management function, of any one or more of:
a mobility update request from an access network;
a TA boundary crossing notification from a location tracking function;
a tracking area request from the UE; and
a positioning request from the UE.

17. The mobility management function as claimed in claim 12, wherein the location tracking information of the UE comprises a current location of the UE.

18. The mobility management function as claimed in claim 17, wherein the current location of the UE includes any one or more of:
a Global Positioning System (GPS) coordinate; and
an identifier of an Access Point connected to the UE.

19. The mobility management function as claimed in claim 12, wherein updating the respective mobility pattern of the UE further comprises:
sending, by the mobility management function, an instruction to an access network to configure mobility tracking and reporting of the UE, in accordance with the selected mobility pattern generation algorithm;

subsequently receiving, from the access network, mobility update reports including mobility tracking information of the UE; and updating the respective mobility pattern of the UE using the selected mobility pattern generation algorithm and the received mobility tracking information of the UE.

20. The mobility management function as claimed in claim 19, wherein the mobility tracking information of the UE comprises any one or more of:

an identifier of an Access Point connected to the UE; and
a detected change in mobility behaviour of the UE.

* * * * *